United States Patent
Woods et al.

(10) Patent No.: US 10,946,392 B2
(45) Date of Patent: Mar. 16, 2021

(54) NEGATIVE ELECTROSTATIC FILTRATION APPARATUS

(71) Applicant: ELF Holding Company LLC, Stillwater, MN (US)

(72) Inventors: Peter Lawrence Woods, Grimsby (CA); Chase Andrews Rickson, White Bear Lake, MN (US)

(*) Notice: Subject to any disclaimer, the term of this patent is extended or adjusted under 35 U.S.C. 154(b) by 256 days.

(21) Appl. No.: 15/894,167

(22) Filed: Feb. 12, 2018

(65) Prior Publication Data

US 2018/0250687 A1  Sep. 6, 2018

(51) Int. Cl.
C02F 1/46 (2006.01)
B03C 5/02 (2006.01)
C02F 1/00 (2006.01)

(52) U.S. Cl.
CPC .............. *B03C 5/026* (2013.01); *C02F 1/001* (2013.01); *C02F 2201/006* (2013.01); *C02F 2201/009* (2013.01); *C02F 2303/06* (2013.01); *C02F 2303/22* (2013.01)

(58) Field of Classification Search
CPC .. C02F 1/467; C02F 1/00; C02F 1/461; C02F 1/46; A47L 15/42; D06F 35/00; D06F 39/10
See application file for complete search history.

(56) References Cited

U.S. PATENT DOCUMENTS

| | | | |
|---|---|---|---|
| 4,372,837 A | 2/1983 | Watson et al. | |
| 5,352,347 A | 10/1994 | Reichert | |
| 5,911,213 A * | 6/1999 | Ahlborn | B03C 3/68 123/572 |
| 6,013,233 A | 1/2000 | Ishii | |
| 6,129,829 A | 10/2000 | Thompson | |
| 6,576,107 B2 | 6/2003 | Thompson | |
| 8,021,523 B2 | 9/2011 | Jarvis | |
| 2003/0192830 A1* | 10/2003 | Memmott | B01D 15/00 210/663 |
| 2006/0278584 A1 | 12/2006 | Bowden et al. | |
| 2008/0302663 A1* | 12/2008 | Jarvis | B01D 17/06 204/556 |
| 2015/0053127 A1* | 2/2015 | Bertalan | B63B 39/03 114/125 |
| 2015/0114913 A1* | 4/2015 | Imai | C02F 1/467 210/748.17 |
| 2015/0314304 A1 | 11/2015 | Toney et al. | |

OTHER PUBLICATIONS

A. Villot, Y.F.J. Gonthier, E. Gonze, and A. Bernis, "Numerical model of current-voltage curve for the wire-cylinder electrostatic precipitators in negative voltage in the presence of nonpolar gases," IEEE Trans. Plasma Sci., vol. 38, No. 8 Part 3, pp. 2031-2040, 2010, doi: 10.1109/TPS.2010.2052373.

(Continued)

*Primary Examiner* — Cameron J Allen

(74) *Attorney, Agent, or Firm* — Carlson, Caspers, Vandenburgh & Lindquist, P.A.

(57) ABSTRACT

Certain exemplary aspects of the present disclosure are directed towards an apparatus for electrostatic fluid filtration. The apparatus utilizing alternating positive and negative electrodes in conjunction with filter media there between to filter contaminants from a fluid flow.

16 Claims, 25 Drawing Sheets

(56) References Cited

OTHER PUBLICATIONS

G. Cooperman, "A New Current-Voltage Relation for Duct Precipitators Valid for Low and High Current Densities," IEEE Trans. Ind. Appl., vol. IA-17, No. 2, pp. 236-239, 1981, doi: 10.1109/TIA.1981.4503931.

https://www.explainthatstuff.com/electrostaticsmokeprecipitators.html.

J. H. Turner and P. A. Lawless, "Section 6 Particulate Matter Controls Chapter 3 Electrostatic Precipitators," Part. Matter Control., p. 70, 199AD, doi: Epa/452/B-02-001.

James H. Turner, Phil A. Lawless, Toshiaki Yamamoto, David W Coy, Gary P. Greinder, John D. McKenna & William M. Vatavuk (1988) Sizing and Costing of Electrostatic Precipitators, JAPCA, 38:4, 458-471, DOI: 10.1080/08940630.1988.10466396.

Lee, J., & Kim, W. (2012). Experimental Study on the Dielectric Breakdown Voltage of the Insulating Oil Mixed with Magnetic Nanoparticles. Physics Procedia, 32(C), 327-334.

P. Cooperman, "A theory for space-charge-limited currents with application to electrical precipitation," Trans. Am. Inst. Electr. Eng. Part I Commun. Electron., vol. 79, No. 1, pp. 47-50, 2013, doi: 10.1109/tce.1960.6368541.

Yanada, H., Takagi, & Mamiya. (2015). Effects of electrode and filter element shapes on characteristics of charge injection type of electrostatic oil filter. Journal of Electrostatics, 74(1), 1-7.

David R. Lide, "Table 2, Dielectric Strength of Liquids", CRC Handbook of Chemistry and Physics, Internet Version 2005, <http://www.hbcpnetbase.com>, CRC Press, Boca Raton, FL, 2005, p. 2454.

F. W. Peek, "Dielectric Phenomena in High Voltage Engineering." McGraw-Hill Book Company, Inc., Second Edition, 1920.

O.F. Esps, "Precipitators Electrostatic," 1991.

K.D. Tran and H. Yanada, "Fundamental Investigation of Charge Injection Type of Electrostatic Oil Filter," J. Adv. Mech. Des. Syst. Manuf., vol. 2, No. 6, pp. 971-984m 2008, doi: 10.1299/jamdsm.2.971.

H. Bai, C. Lu, and C. L. Chang, "A model to predict the system performance of an electrostatic precipitator for aollecting polydisperse particles," J. Air Waste Manag. Assoc., vol. 45, No. 11, pp. 908-916, 1995, doi: 10.1080/10473289.1995.10467423.

"Physical Constants of Organic Compounds," CRC Handbook of Chemistry and Physics, pp. 3-1-3-573, 2005.

* cited by examiner

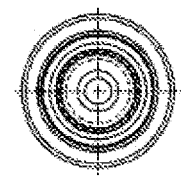
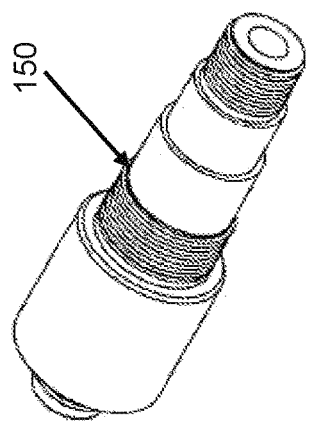
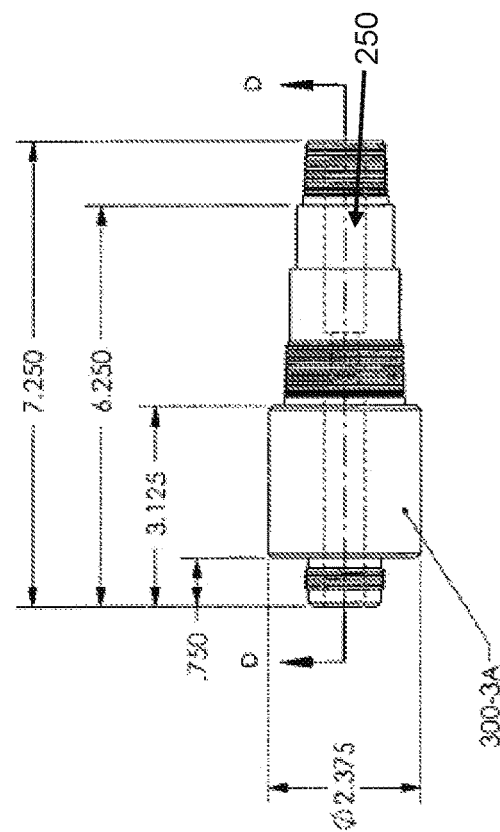
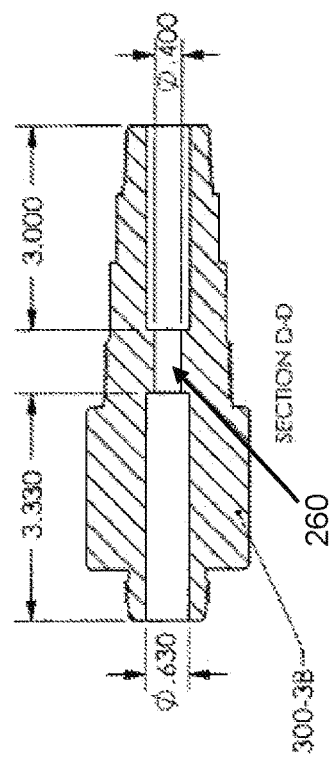
FIG. 3A
FIG. 3B
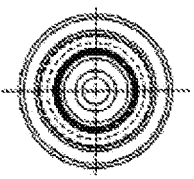

CONTROL CIRCUITRY

NEGATIVE ELECTROSTATIC FILTRATION APPARATUS

SUMMARY

Various example embodiments are directed to apparatuses, systems, and related methods involving electrostatic fluid filtration suitable for removing insoluble contaminants known to produce undesirable varnish and sludge in non-conductive fluids (e.g., dielectric fluids). The electrostatic fluid filtration apparatus removes contaminants and may remove trace amounts water and from the fluid.

Various embodiments of the present disclosure are directed to an apparatus comprising: a conductive housing, a plurality of positive electrodes, and a plurality of negative electrodes alternately disposed between the positive electrodes within the conductive housing. Each alternately disposed pair of positive and negative electrodes form an electrostatic field between each of the positive and negative electrodes in response to the negative electrodes receiving a negative voltage. The electrostatic field acts on contaminants within a fluid flow extending between the positive and negative electrodes to filter the contaminants from the fluid. The removable filter cartridge including a filter media extending between each of the positive and negative electrodes within the conductive housing removes additional contaminants from a fluid flow extending between the positive and negative electrodes. A power supply, electrically coupled to the negative electrodes, transmit the negative voltage to the negative electrodes. Similarly, the conductive housing and the positive electrodes are electrically coupled to one another to form an electrical ground.

In further more specific embodiments, the plurality of positive and negative electrodes are flat and maintain a specified spacing as to result in the strongest and most consistent electrostatic field (spacing subject to scale).

One or more of these embodiments may be particularly applicable, for example, to fluid contamination, and may more particularly relate to the removal of contaminants from common fluids, including non-conductive fluids and/or dielectric fluids. Such removal of contaminants will allow for the prolonged use or recycling/reuse of such fluids.

Various example embodiments are directed to a system for removing insoluble contaminants from a non-conductive and/or dielectric fluid. The system comprising an electrostatic fluid filtration device, a power supply, a fluid flow pump and sensor, a contaminant sensor, pressure and vacuum transducers, water sensor and controller circuitry and software. The electrostatic fluid filtration device includes a conductive housing, a plurality of positive electrodes, a plurality of negative electrodes, and a removable filter cartridge. The plurality of negative electrodes is alternately disposed between the positive electrodes within the conductive housing. Each alternately disposed pair of positive and negative electrodes form an electrostatic field between each of the positive and negative electrodes in response to the negative electrodes receiving a negative voltage. The electrostatic field acts on contaminants within a fluid flow extending between the positive and negative electrodes to filter the contaminants from the fluid. The conductive housing and the positive electrodes are electrically coupled to one another to form an electrical ground. The removable filter cartridges includes a filter media extending between each of the positive and negative electrodes within the conductive housing. The filter media removes additional contaminants from a fluid flow extending between the positive and negative electrodes. The plurality of positive and negative electrodes and the conductive housing direct the flow of fluid within the conductive housing axially in response to a first electrostatic field between a first pair positive and negative electrodes with a first electrical charge. The plurality of positive and negative electrodes and the conductive housing further direct the flow radially outward toward the outer wall of the conductive housing in response to the next electrostatic field between the next pair of positive and negative electrodes with the electrical charge different then the first electrostatic field. The negative power supply electrically coupled to the plurality of negative electrodes and the positive electrodes electrically coupled to one another and the conductive housing to create a ground produce a series of alternating electrostatic fields between each pair of electrode (number of fields are scalable). The fluid flow pump coupled to an inlet of the conductive housing directs a flow of fluid into the electrostatic fluid filtration device. The contaminant sensor, coupled to the inlet and/or an outlet of the conductive housing, detects the contaminant level of the fluid flowing past the contaminant sensor. The controller circuitry and software receives data from the fluid flow sensor indicative of a fluid flow rate, data from the contaminant sensor indicative of fluid contaminant level, data from the pressure and vacuum transducers, data from the water sensor, and data indicative of an output of the power supply. This data is reported and analyzed to determine filter life.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which:

FIG. 3A is a side view of an insulated high voltage module, consistent with various aspects of the present disclosure;

FIG. 3B is a cross-sectional side view of the insulated high voltage module of FIG. 3A, consistent with various aspects of the present disclosure;

Figure 1A:
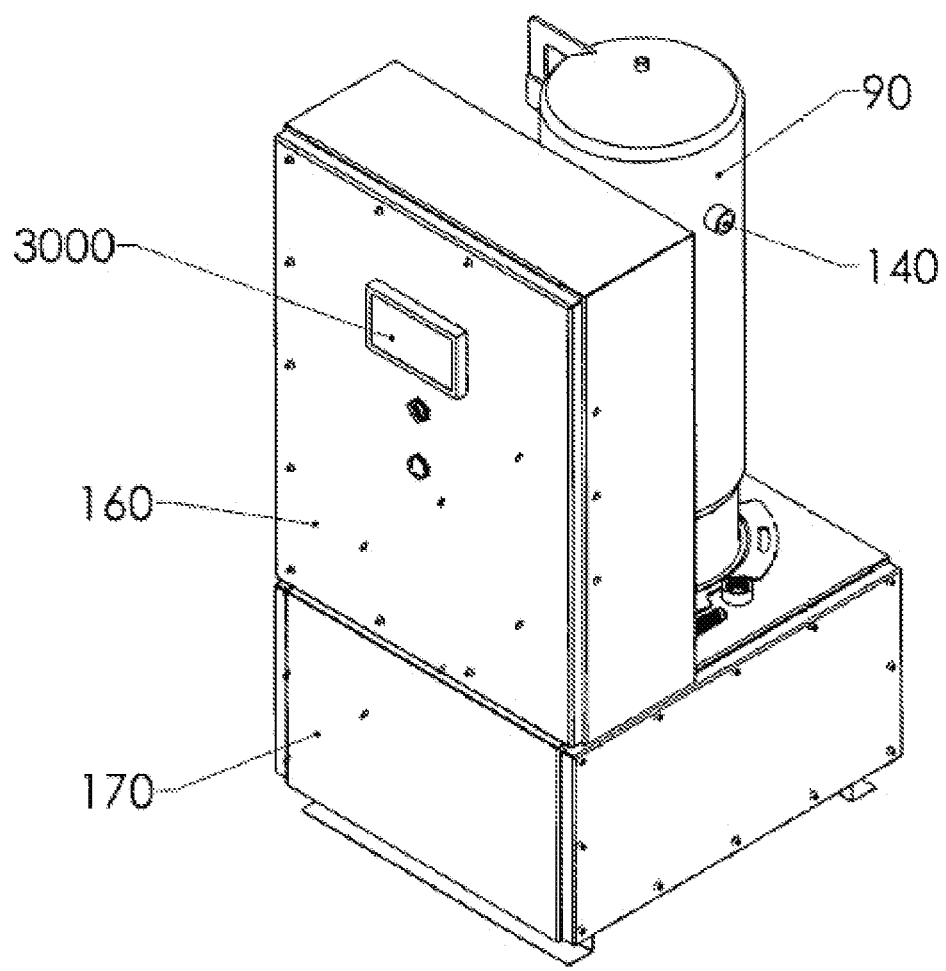
FIGS. 1A-1I are isometric views of an electrostatic cartridge apparatus, consistent with various aspects of the present disclosure.
Figure 1B:
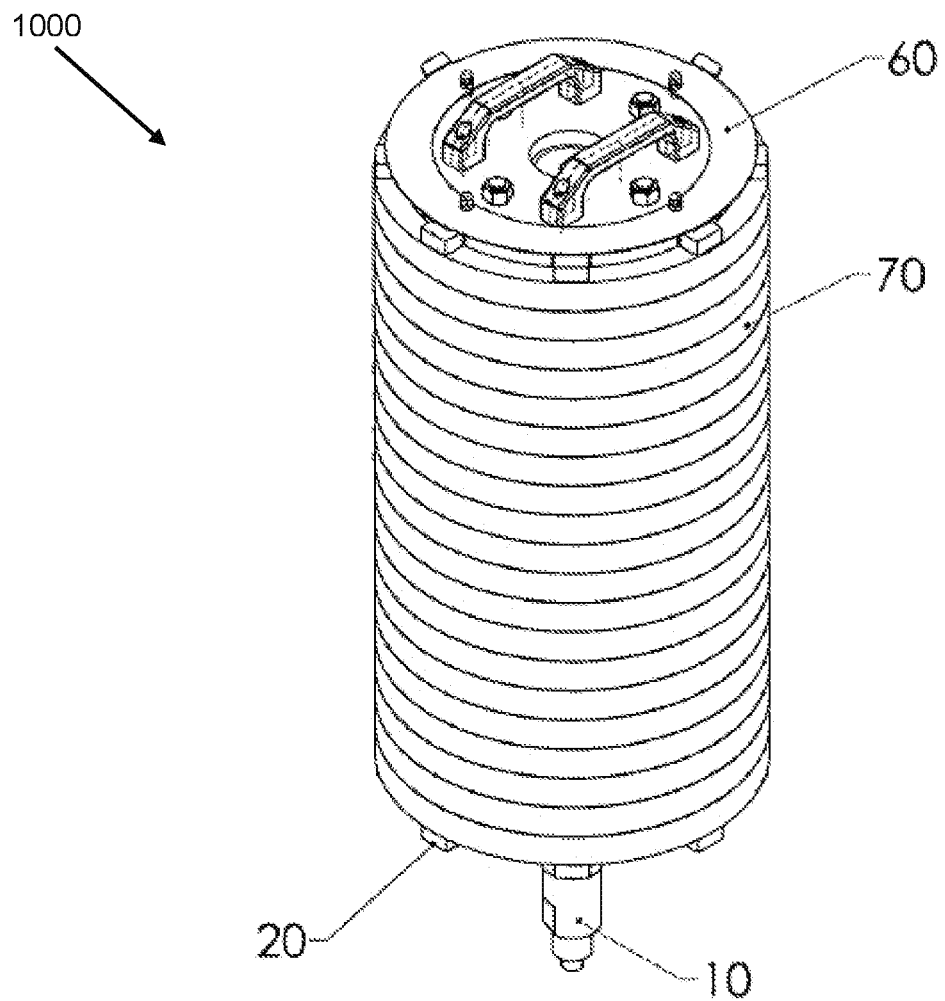
Figure 1C:
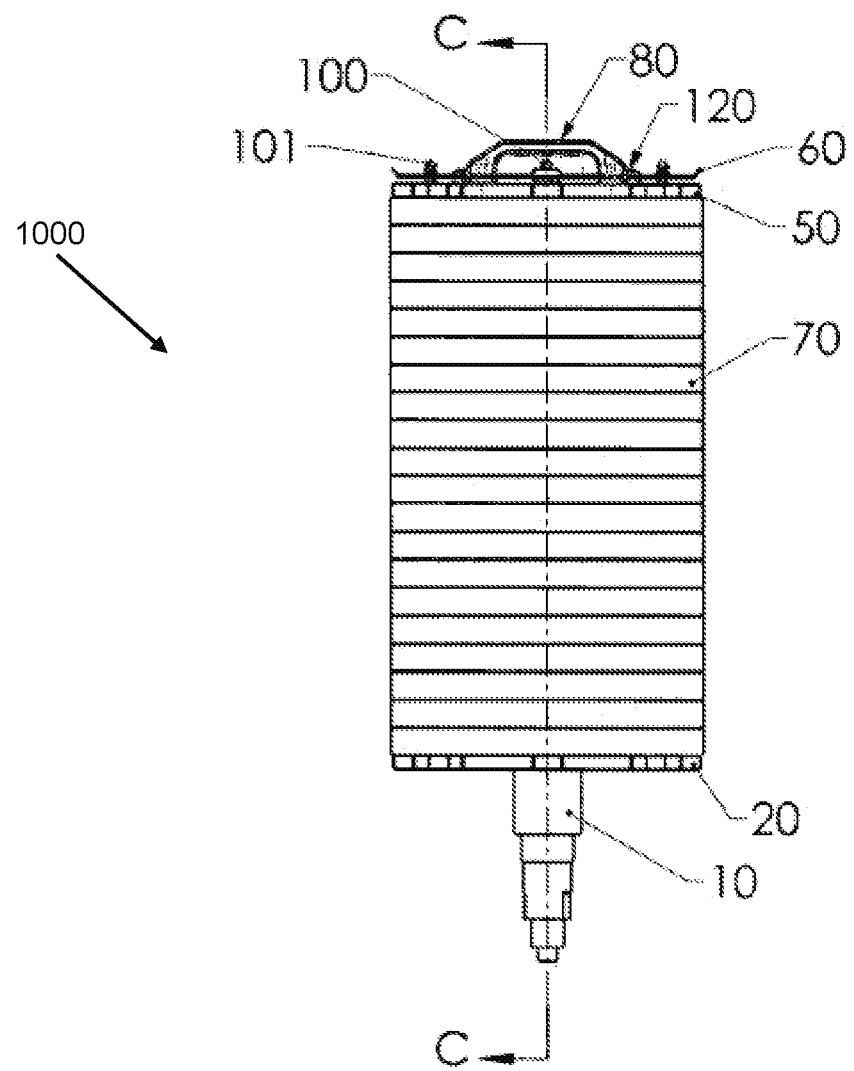
Figure 1D:
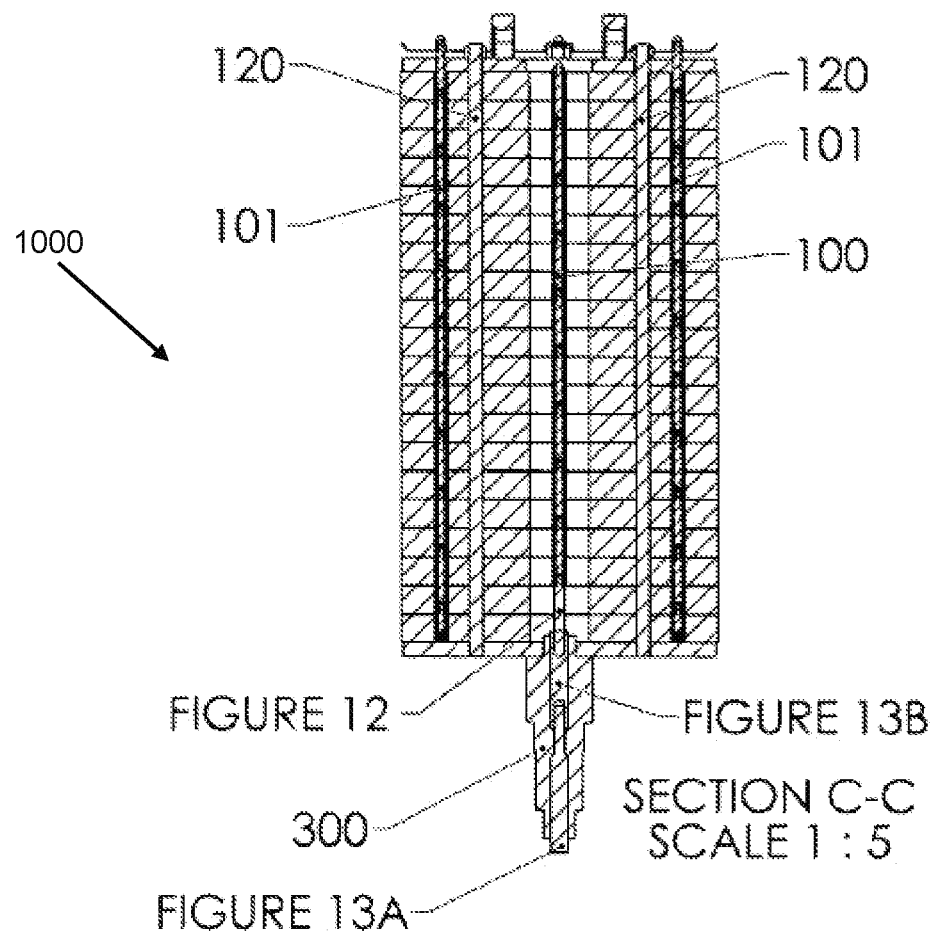
Figure 1E:
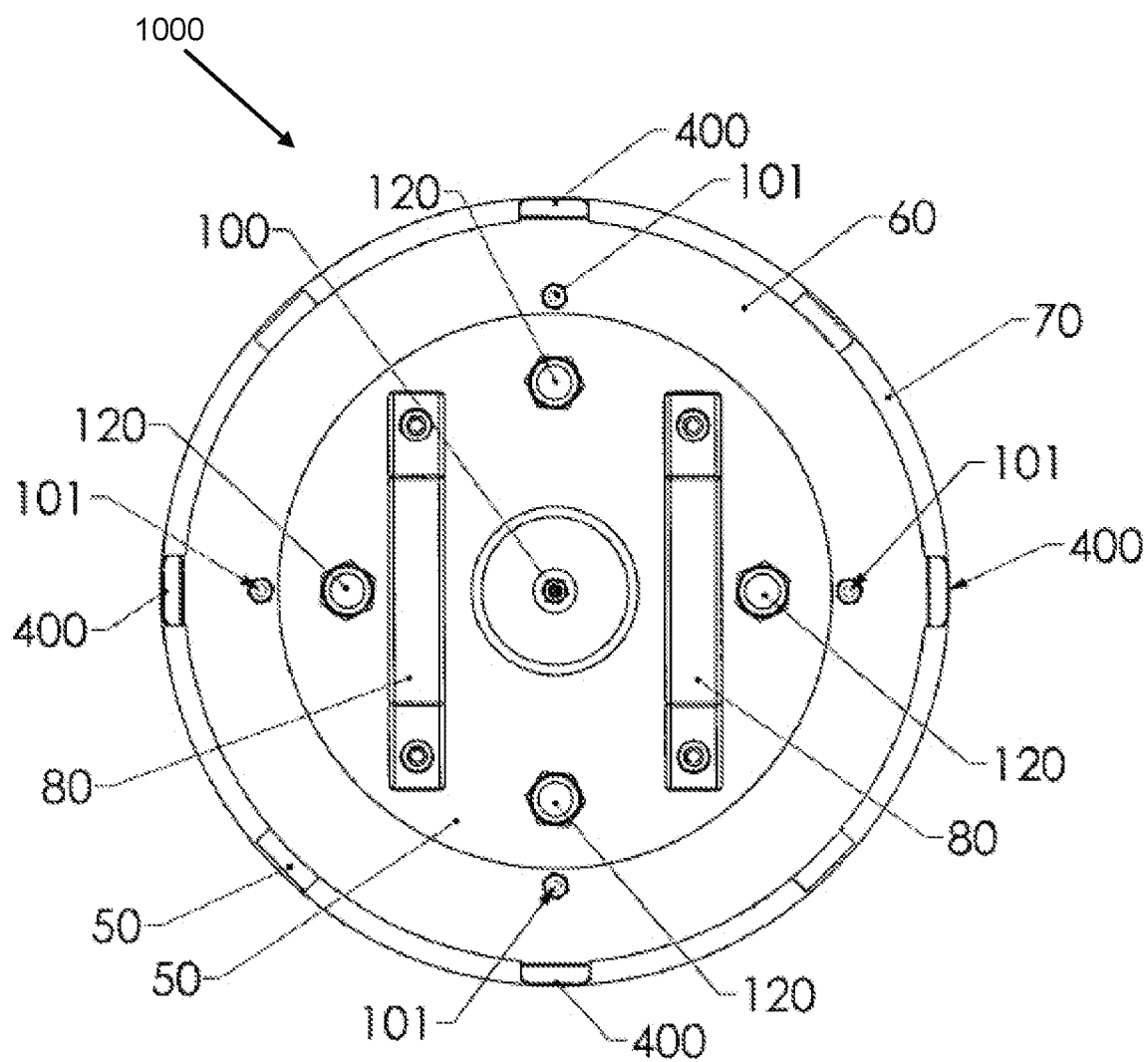
Figure 1F:
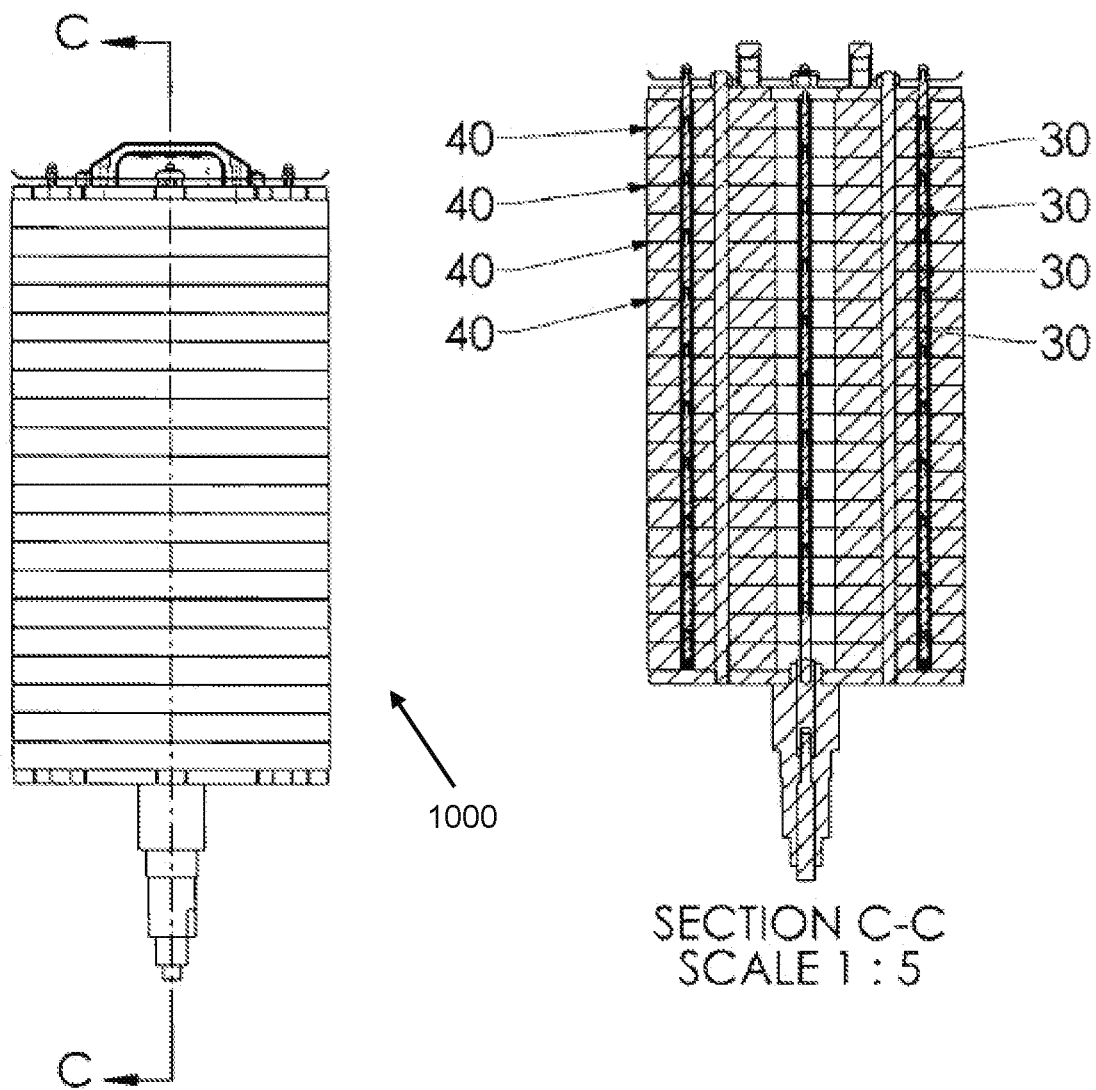
Figure 1G:
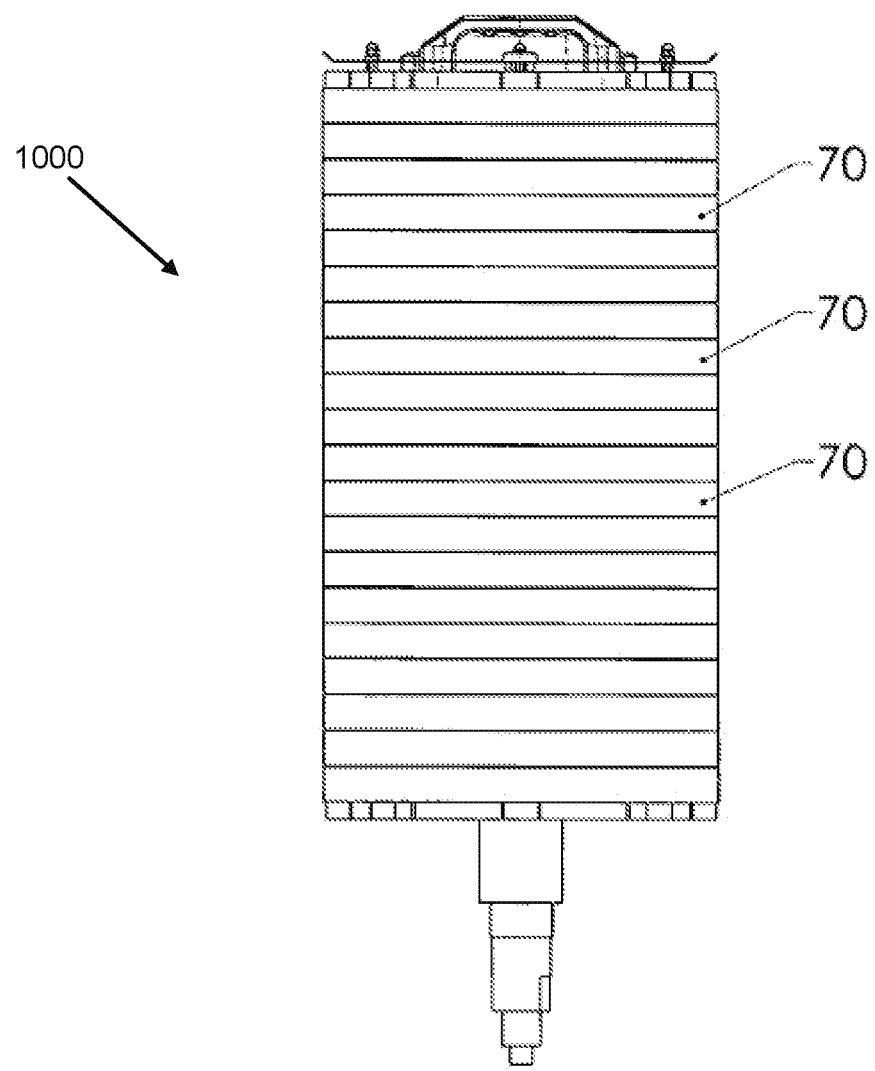
Figure 1H:
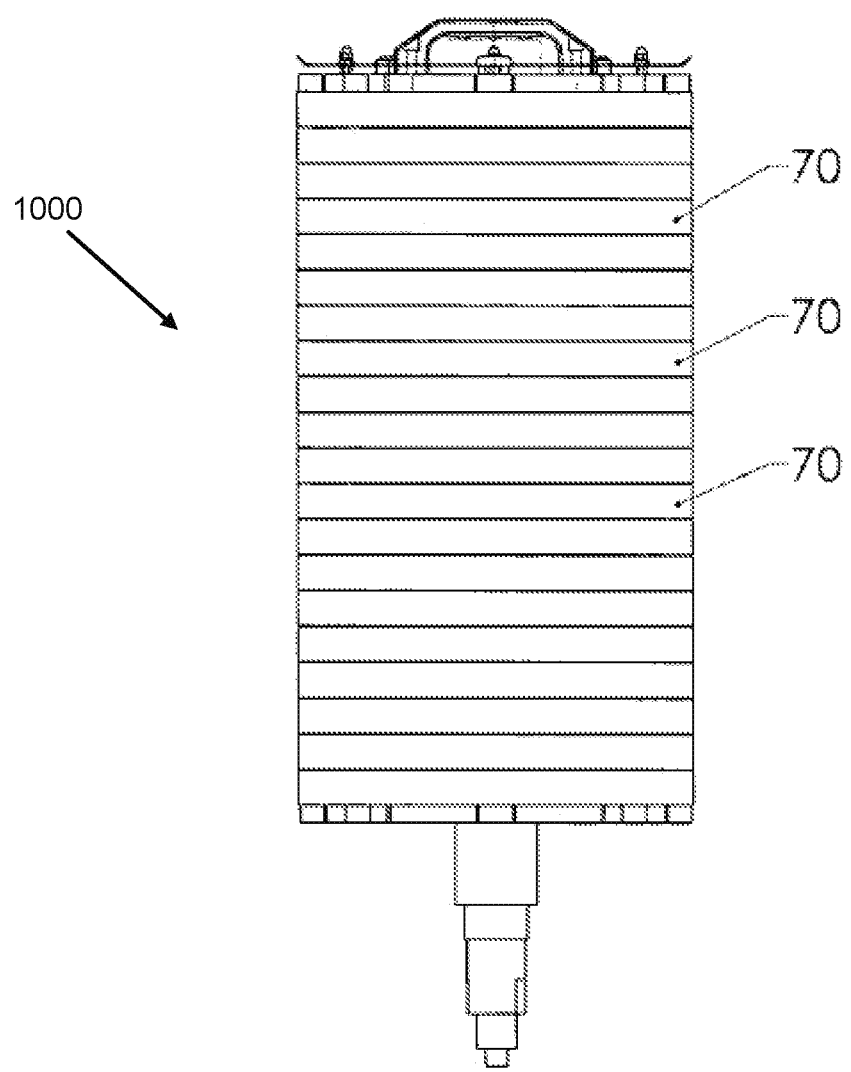
Figure 1I:
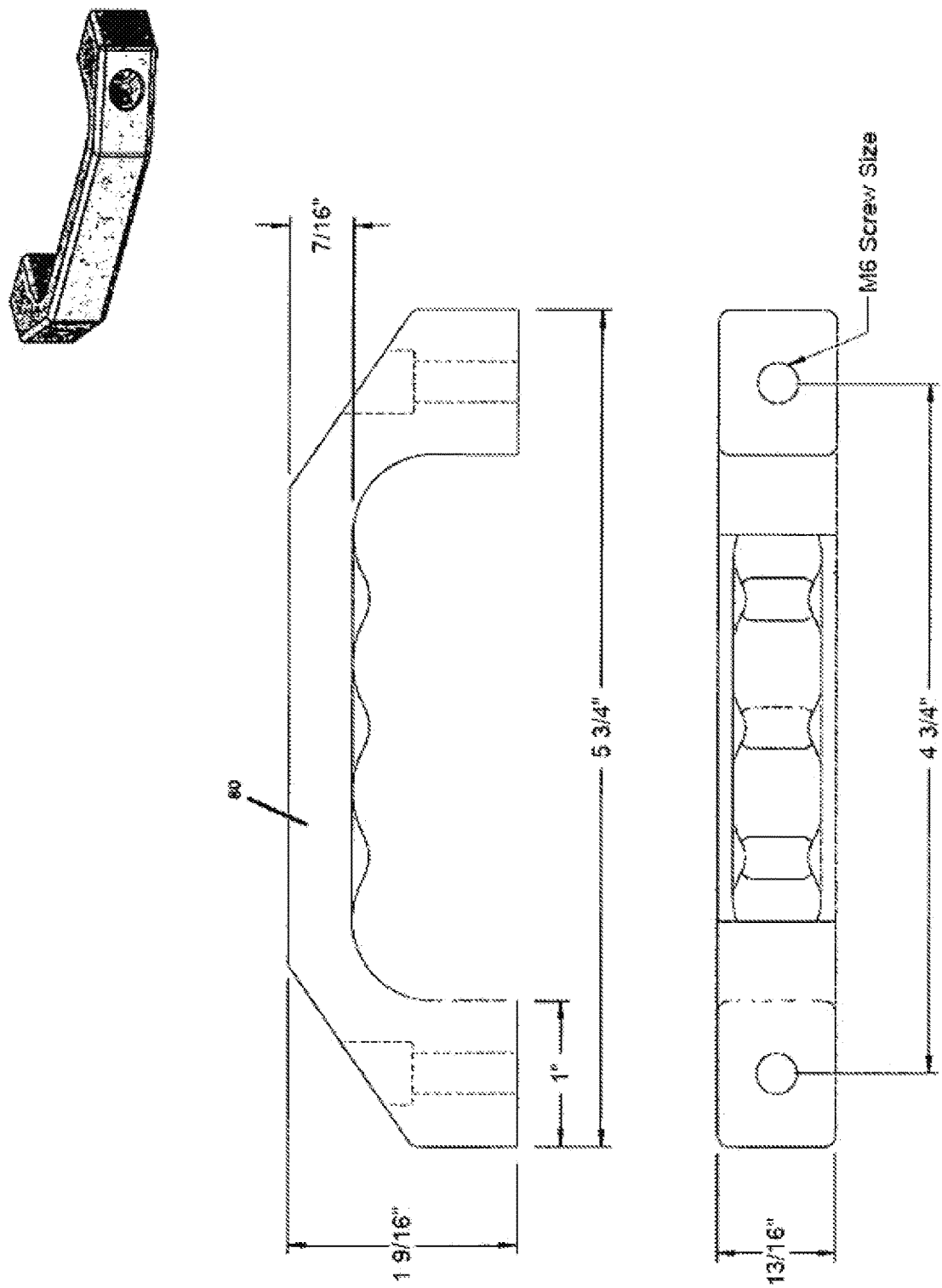

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems, and methods for filtration of fluid contamination within a liquid. Specific embodiments, including electrostatic fluid filtration systems, are believed to be particularly beneficial to the removal of sub-micron contaminants. The formation of sub-micron contaminants (e.g., varnish and sludge) in non-conductive fluids (e.g. dielectric fluids) will cause damage, over time, to machinery utilizing such fluids. While the present disclosure is not necessarily so limited, various aspects of the disclosure may be appreciated through a discussion of examples using this context.

Fluid contamination in hydraulic and lubrication systems will cause excessive wear, and/or machinery/system failure over time. Common contamination in industrial systems includes varnish contamination, which is at least in part a by-product of oil-degradation in these systems. The occurrence of oil-degradation, and the resultant varnish deposition, has been associated with tighter filtration requirements, higher flow rates for lubricating oil, increased machinery operating temperatures, and industry migration to Group II based oil formulations. By utilizing electrostatic fluid filtration systems disclosed herein, varnish, sludge, and other deposit formations will be filtered from the fluids utilized in industrial machinery systems, thereby maintaining system reliability, and production continuity in a manufacturing or production environment. Various industrial systems particularly susceptible to damage associated with contaminant build-up in hydraulic and lubrication fluids include bearings and servos.

Mechanical components in industrial machinery are particularly susceptible to contaminant deposition on metal surfaces, such as reservoirs, bearings, and servo-valves. These deposits are often thin, insoluble films. Many contaminants associated with oil-degradation, such as varnish, have high molecular weights and are insoluble in oil. It has been discovered that contaminants, such as varnish insoluble are more than 75 percent soft contaminants that are less than 1 micron in size and are not detected by traditional laboratory analysis. Due to the contaminants sub-micron size, traditional mechanical filters (effective to ~3 micron) due not remove the contaminants from hydraulic and lubrication fluids. Without filtration from the fluid, the polar affinities of the sub-micron insoluble compounds, over time, draws the contaminants to proximal machine surfaces and are eventually deposited thereon. Upon deposition, deposited surfaces may exhibit a gold or tan color, gradually deepening over time to darker gum-like layers that eventually develops into varnish. In hydraulic applications, for example, the varnish will alter the frictional characteristics of the machine surface causing increased wear to adjacent contacting components. In lubrication applications, for example, the altered machine surface will cause increased turbulence to the flow of lubricant decreasing efficiency and/or increasing operating temperature.

The build-up of sub-micron insoluble contamination particles in industrial machinery will also create lubricant imbalances. Lubricant imbalances, over time, will further accelerate oil-degradation and additional contaminant propagation. Such lubricant imbalances contribute to a number of factors including oxidation, cross- and chemical-contamination, micro-dieseling and adiabatic compression. The difficult of reducing and/or eliminating such factors all together in any lubricant or hydraulic application would be exceedingly difficult and likely cost prohibitive. Embodiments of the present disclosure reduce the need to address such lubricant imbalances in a given application by removing the harmful by-product contaminants from the system prior to depositing to machine surfaces in the system and resulting wear and damage.

Contaminant deposits on machine surfaces can cause numerous operational issues by interfering with the reliable performance of the fluid and the machine's mechanical movements. They can also contribute to wear and corrosion or simply just cling to surfaces. In one specific example, contaminant build-up will prevent hydrodynamic lubrication of a bearing surface, resulting in bearing failure. In yet other applications, contamination in hydraulic applications will cause restriction and stiction in moving mechanical parts such as servo or directional valves, and/or increased component wear due to varnish propensity to attract dirt and solid particle contaminants. In heat exchanger applications, contamination will reduce heat transfer due to varnish insulation effect. In various applications, catalytic deterioration of the lubricant will reduce the affective life of the lubricant increasing operating costs. Contaminants has also been discovered to plug small oil flow orifices and oil strainers, increase friction, heat and energy, damage mechanical seals, cause bearing failure, etc.

Various embodiments of the present disclosure are directed to an apparatus comprising: a conductive housing, a plurality of positive electrodes, and a plurality of negative electrodes alternately disposed between the positive electrodes within the conductive housing. Each alternately disposed set of positive and negative electrodes form an electrostatic field between each of the positive and negative electrodes in response to the negative electrodes receiving a negative voltage. The electrostatic field acts on contaminants within a fluid flow extending between the positive and negative electrodes to filter the contaminants from the fluid. A removable filter cartridge including a filter media extending between each of the positive and negative electrodes within the conductive housing removes additional contaminants from a fluid flow extending between the positive and negative electrodes. A negative power supply, electrically coupled to the negative electrodes; transmit the negative voltage to the negative electrodes. Similarly, the conductive housing and the positive electrodes are electrically coupled to one another to form an electrical ground. In furthermore specific embodiments, the plurality of positive and negative electrodes are flat and maintain a specified spacing as to result the strongest and most consistent electrostatic field (spacing subject to scale).

In certain specific embodiments, a plurality of positive and negative electrodes and a conductive housing direct the flow of fluid within the conductive housing axially in response to a first electrostatic field between a first pair of positive and negative electrodes with a first electrical charge, and to flow radially inwards away from an outer wall of the conductive housing in response to a second electrostatic field between the next set of positive and negative electrodes with an electrical field different then the first electrostatic field.

In many embodiments, a plurality of positive electrodes has a circumference greater than a circumference of each of a plurality of negative electrodes. In such embodiments, each of the plurality of positive electrodes will be electrically and mechanically coupled to the conductive housing. In yet other embodiments, each of the plurality of negative electrodes will be electrically coupled to one another by conductive off-sets, and each of the plurality of positive electrodes are electrically coupled to one another by conductive off-sets.

In specific embodiments of an electrostatic fluid filtration apparatus, consistent with various aspects of the present disclosure, a conductive housing of the apparatus further includes a fluid inlet positioned at a distal end of the conductive housing. The fluid inlet receives a flow of contaminated fluid into the conductive housing, and a fluid outlet positioned at a proximal end of the conductive housing to output a flow of de-contaminated fluid from the conductive housing. In various embodiments, the conductive housing may take a number of shapes including a cylinder, a cube, etc.

Various example embodiments are directed to a system for removing insoluble contaminants from a non conductive fluid. The system comprising an electrostatic fluid filtration device, a power supply, a fluid flow pump, a contaminant sensor, and controller circuitry and software. The electrostatic fluid filtration device includes a conductive housing, a plurality of positive electrodes, a plurality of negative electrodes, and a removable filter cartridge. The plurality of negative electrodes is alternately disposed between the positive electrodes within the conductive housing. Each alternately disposed pair of positive and negative electrodes form an electrostatic field between each of the positive and negative electrodes in response to the negative electrodes receiving a negative voltage. The electrostatic field acts on contaminants within a fluid flow extending between the positive and negative electrodes to filter the contaminants from the fluid. The conductive housing and the positive electrodes are electrically coupled to one another to form an electrical ground. The removable filter cartridge includes a filter media extending between each of the positive and negative electrodes within the conductive housing. The filter media removes additional contaminants from a fluid flow extending between the positive and negative electrodes. The plurality of positive and negative electrodes and the conductive housing direct the flow of fluid within the conductive housing axially in response to a first electrostatic field between a first set positive and negative electrodes with the electrical charge. The plurality of positive and negative electrodes and the conductive housing further direct the flow radially outwards towards the outer wall of the conductive housing in response to the next electrostatic field between the next set of positive and negative electrodes with an electrical field separate then the first electrostatic field. The negative power supply electrically coupled to the plurality of negative electrodes and negative electrodes electrically coupled together and to the conductive housing to produce a ground produce a series of alternating electrical fields between each set of electrode plates. The fluid flow pump coupled to an inlet of the conductive housing directs a flow of fluid into the electrostatic fluid filtration device. The contaminant sensor, coupled to the inlet and/or an outlet of the conductive housing, detects the contaminant level of the fluid flowing past the contaminant sensor. The controller circuitry and software receives data from the fluid flow sensor indicative of a fluid flow rate, data from the contaminant sensor indicative of fluid contaminant level, data from the pressure and vacuum transducers, data from the water sensor, and data indicative of an output of the power supply. This data is reported and analyzed to determine filter life.

In more specific embodiments of the system for removing insoluble contaminants from a non conductive fluid, the controller circuitry and software further includes communication circuitry to transmit data received by the controller circuitry and software to remote computer circuitry software. The aggregated data produced from the apparatus could collect and transmitted wirelessly or wired to another device for storage or further analysis remotely.

Detailed embodiments of the system for removing insoluble contaminants from a non conductive fluid may further include a water sensor, coupled to an inlet or outlet of the electrostatic fluid filtration device that transmits data to controller circuitry and software indicative of the existence of water within the fluid flow entering the electrostatic fluid filtration device. The controller circuitry and software, in response to receiving data from the water sensor indicative of the existence of water within the fluid flow, shuts down the fluid flow pump, and output of the power supply, and indicates to an operator the need to stop the operation of the electrostatic fluid filtration device.

Controller circuitry and software of the present disclosure may analyze data received from the fluid flow sensor, indicative of a fluid flow rate, data from the contaminant sensor indicative of fluid contaminant level, data from the pressure and vacuum transducers, data from the water sensor, and data indicative of an output of the power supply, and based on the analyzed data characterize the fluid filter within the electrostatic fluid filtration device. Optionally, the controller circuitry and software may indicate to an operator that a filter change is necessary once the contamination of the filter exceeds a threshold level.

Various embodiments of the system for removing insoluble contaminants from a non conductive fluid including an electrostatic fluid filtration device that reverses varnish within machine surfaces in contact with the fluid by reducing the contaminant level within the fluid below a contaminant saturation level; wherein, contaminants comprising the varnish are drawn from within the machine surfaces into the fluid whereby the contaminants are filtered by the electrostatic fluid filtration device. Optionally, the system may include a reservoir that holds the fluid. The reservoir may be coupled to the rest of the system in a number of configurations, including for example, it may be coupled to an inlet and outlet of the electrostatic fluid filtration device in a kidney loop or in-line configuration.

In various specific/experimental embodiments of the present disclosure, an electrostatic fluid filtration system removes sub-micron insoluble contaminants known to cause both varnish and sludge from non-conductive fluids such as dielectric fluids. The electrostatic fluid filtration system removes contaminants from a target fluid (e.g. a dielectric fluid) by directing the targeted fluid through a stack of electrostatic filtration electrodes. The number of electrostatic filtration apparatus' in series or parallel may vary based on the particular application, the contamination level of the fluid, and the desired filtering time to a desired purity. The electrostatic filtration apparatus applies an electrostatic charge to the fluid flowing through the cartridges. The electrostatic charge has no effect on dielectric fluids flowing through the electrostatic filtration apparatus. However, conductive materials such as contaminants have a force induced upon them by the electrostatic charge, which allows for the filter and capture of such contaminants.

To increase the efficiency of the electrostatic fluid filtration system, control circuitry and software will maintain voltage from the power supply inputs thereto. The system may further utilize a number of sensors to determine the condition of the filter before and after filtration to determine the efficacy and to analyze the filtering properties of the system. Inline water sensors may be utilized adjacent the input and output of the system to determine water contamination levels of the fluid. Similarly, inline particle counters can be utilized to determine sub-micron contaminants in the fluid before and/or after filtration. It is to be understood that a myriad of sensors may be utilized to further improve the efficiency and efficacy of the electrostatic fluid filtration system, and such systems are readily encompassed by the present disclosure. Further examples of sensors that various embodiments of the present disclosure may utilize include, but not necessarily limited to: an oil temperature sensor, a flow switch, a float switch, a digital pressure gauge, a digital vacuum gauge, etc.

In application specific embodiments, one or more conductive filtration units could be utilized in series or in parallel (depending on application contamination levels). In many contaminant-intensive applications, the electrostatic fluid filtration system may include a number of electrostatic filtration apparatus' in parallel with filters that may be replaced periodically when filtration efficiency of the system degrades. In further more specific embodiments, the control circuitry and software may be communicatively coupled via wired/wireless communication to other computer circuitry allowing for remote, real-time updates of electrostatic fluid filtration system status.

These updates may include information on the filtration system including contamination levels, etc. based on the received sensor data.

Embodiments of the electrostatic fluid filtration system could further include electronic data storage communicatively coupled to the controller circuitry and software. During filter operation, the controller circuitry and software will analyze various data on the fluid received from the sensor(s) communicating with the controller circuitry. This data analyzed by the electrostatic fluid filtration system to determine when filter cartridges have reached the end of their useful life. In yet further more specific embodiments, the controller circuitry and software can utilize sensor data to optimize fluid filtration by analysis, and even extend the life of the machine utilizing the filtered fluids notification of required filter change. For example, where the electrostatic fluid filtration system determines that the filter within the apparatus meet a threshold, the apparatus filtering the fluid notifies user of filter life and/or replacement required or apparatus shut-down to prevent damage.

In more basic embodiments of the present disclosure, an electrostatic fluid filtration system may only have a single filter cartridge housing. During operation of the electrostatic fluid filtration system, with an electrostatic filter cartridge installed in the conductive housing, the target fluid will be electrostatically filtered. When the controller circuitry and software receives data from a water sensor in the system indicative of the presence of water levels above a desired threshold level, the controller circuitry will initiate a water contamination state. In the water contamination state, the controller circuitry may: shut-down the machine utilizing the water contaminated fluid to prevent damage, alert an operator of the state, After the water sensor data indicates that the water levels are back within a desired threshold, normal operation may resume.

Many embodiments of the electrostatic fluid filtration system may include the use of controller circuitry and software to monitor contaminant particle counts (via inline particle counter or other similar sensor) in the filtered fluid for filter efficacy analysis. This data may be monitored by an operator at the controller
circuitry, or remotely (where the controller circuitry is communicatively coupled via wired/wireless communications to other computer circuitry). In such embodiments, all functions of the electrostatic fluid filtration system may be monitored by the controller circuitry, including: water and particle contamination), pressure (vacuum), filter life, leak detection, fluid flow, filter current levels, filter high voltage levels, oil temperature, system total run hours, among others.

The electrostatic fluid filtration system may include a sealable conductive housing with a replaceable cartridge comprising a number of spaced parallel electrode plates and sections of a filtration media placed between the electrode plates. In the filtration unit, the target fluid flows axially and radially through the filtration media that is positioned between the electrode plates in a generally horizontal flow pattern. This forces the targeted fluid to traverse alternating multiple electrostatic fields in a linear fashion and in a single pass through the contaminant filtration unit. The electrostatic fields created by the alternating electrode plates act on conductive contaminants to filter and/or trap such contaminants in the filtration unit, while allowing the dielectric fluid to freely traverse through the electrostatic fluid filtration system. Proper treatment of contaminated fluid may be accomplished by controlling the amount of time the fluid remains in the filtration unit, the number of passes through the unit, as well as increasing the filter surface area that the target fluid is exposed to during treatment.

In another specific/experimental embodiment, an electrostatic fluid filtration system for removing molecularly insoluble contaminants known to cause both varnish and sludge from fluids such as dielectric fluids are disclosed. The electrostatic fluid filtration system including a housing that houses: control circuitry, one or more pumps, one or more high voltage power supplies, an inline water sensor, an inline particle counter, a flow switch, a float switch, an oil temperature sensor, wired/wireless communication circuitry for remote monitoring and system diagnostics of the system, a digital pressure/vacuum gauge, and an electrostatic filtration unit. The filtration unit comprises a conductive housing, replaceable filter cartridge positioned within the housing, and a removable lid to facilitate replacement of the replaceable cartridge. It is further to be understood that in various other applications, depending on customer requirements, fluid volume and viscosity. There may be one or more conductive housings and of varying sizes utilized.

In many embodiments, the electrostatic filtration unit includes a conductive housing with inlet and outlet ports being located opposite from one another on the housing. A replaceable cartridge including a number of electrode plates that are positioned inside the electrically conductive housing. Each of the adjacent electrode plates are oppositely electrically charged (negative or positive). A filtration media is placed between each oppositely charged electrode plate pairing. For treatment, a fluid is pumped at a relatively low pressure into the filtration unit at the inlet port. The pressure of the fluid to be treated is greater than a head pressure of a machine the electrostatic fluid filtration system is connected thereto.

Various embodiments of the present disclosure improve conductivity between the electrically conductive housing and the replaceable filter cartridges utilizing a twist lock connection that ensures absolute mechanical contact therebetween. This electrically conductive connection is critical to the efficiency of the filter unit as the negative electrode plates are electrically charged. The positive electrode plates are connected through a section of the conductive housing wall. The twist lock connection allows for easy removal of filter cartridges from the conductive housing where required for maintenance or replacement, while also providing increased conductivity between the conductive housing and the electrode plates reducing power losses and increasing contaminant capture rates during filter unit operation.

In specific embodiments requiring increased contaminant capture rates while maintaining smaller space requirements, scaling of the apparatus may be desirable, to include increase or decrease in the number of electrodes, size of apparatus, pumps, plumbing, housings, etc. The scalability may increase the efficiency of the electrostatic filtration apparatus. Depending upon the reservoir size, increasing or decreasing the number of electrostatic fields, and/or time of filtration, required to clean the target fluid to a desired level may be adjusted.

In many embodiments of the present disclosure, during operation, an electrostatic fluid filtration system receives fluid to be treated through an inlet zone located at the bottom of the conductive housing. During filtration, the fluid flows axially (relative to the circular conductive housing), until it contacts an electrode plate which forces the fluid to flow radially through a filtration media that is positioned between the electrode plates until it reaches the wall of the conductive housing where the fluid momentarily flows axially until again being redirected through another filtration media between two electrode plates. Depending on the electrostatic fluid filtration system, this flow of the fluid is repeated until the fluid has passed between each successive pairs of electrode plates and through all of the filtration media, after which the de-contaminated fluid exits the conductive housing via an outlet port.

Turning now to the figures, various embodiments of the present disclosure are presented by way of the illustrations. FIGS. 1A-1I are isometric views of an electrostatic filter cartridge 1000 of an electrostatic fluid filtration system, with and without electrostatic filter media 70 (also referred to as filter media) installed, respectively. The insulated high voltage module 10 delivers high voltage from a power supply to the conductive housing. The bottom filter plate 20 mounts the filter media 70 (which may be either conventional or non-conventional filter media; e.g., cellulose, reticulated foam, glass fiber, paper) to the insulated high voltage module 10, which in some embodiments utilizes a twist lock connection allowing for more efficient electrical conduction between the high voltage module 10 and negative electrodes 30 and positive electrodes 40 of the filtration system. A top filter plate 50 is located at the top of the electrostatic cartridge apparatus, with the bottom and top filter plates, 20 and 50 respectively, sandwiching the filter media 70 and positive and negative electrodes (40 and 30). A top ground plate 60 coupled to the top of the electrostatic filter cartridge 1000 prevents electrical discharge of the high voltage flowing between the positive and negative electrodes from extending outside of the conductive housing. For ease of access of the electrostatic filter cartridge within the conductive housing for maintenance and replacement of filters, handles 80 are coupled to the top ground plate 60. In embodiments utilizing a twist lock connection. A simple rotation of the handle will release the electrostatic filter cartridge from the conductive housing and allow for access to the filters 70 within.

Figure 2A:
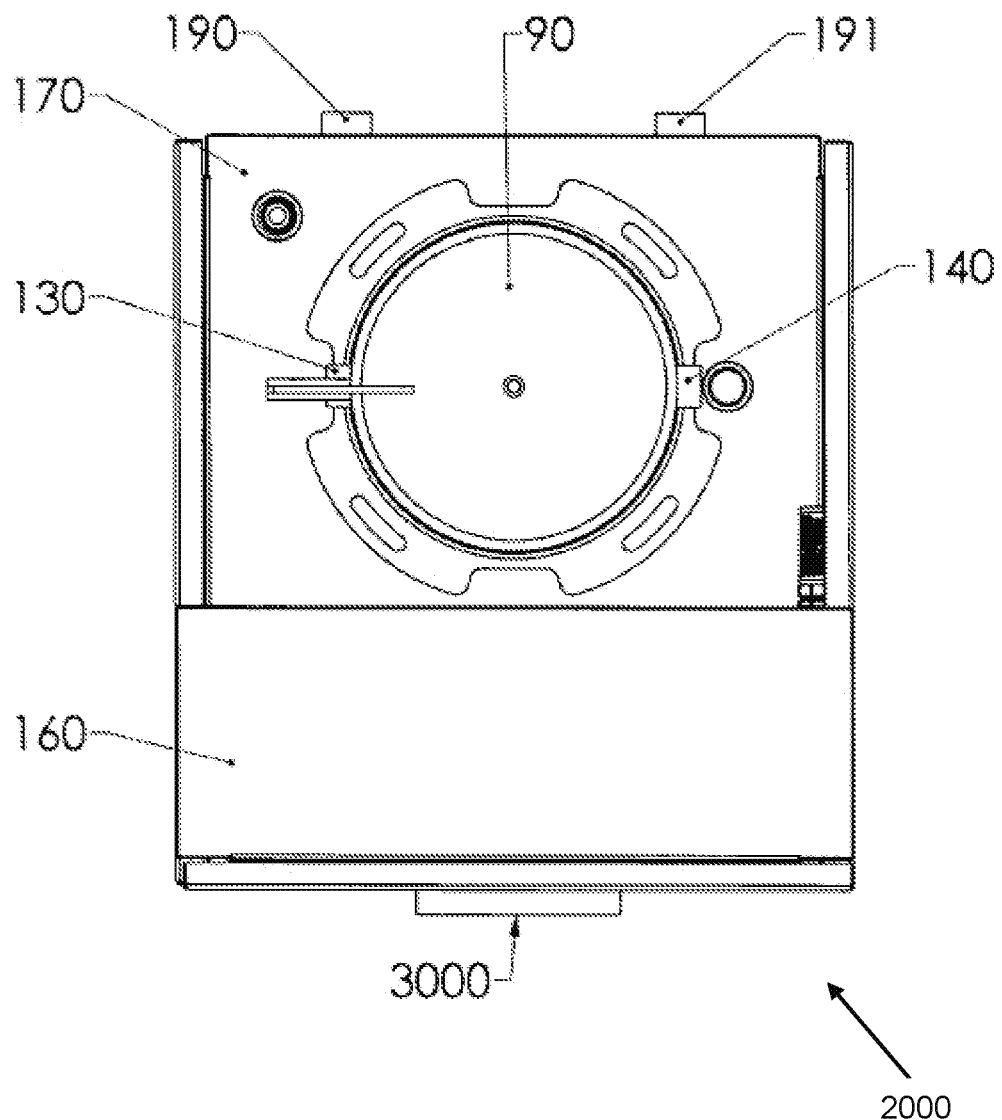
FIG. 2A is a top view of an electrostatic fluid filtration system, consistent with various aspects of the present disclosure.

FIG. 2A is a top view of an electrostatic fluid filtration system 2000, consistent with various aspects of the present disclosure. An electrostatic filter cartridge 1000 is inserted within a conductive filter housing 90, with handles 80 and top ground plate 60 viewable. An access hole through the top ground plate 60 provides a fluid flow path from the exit of fluid from the electrostatic fluid filtration system 2000.

Figure 2B:
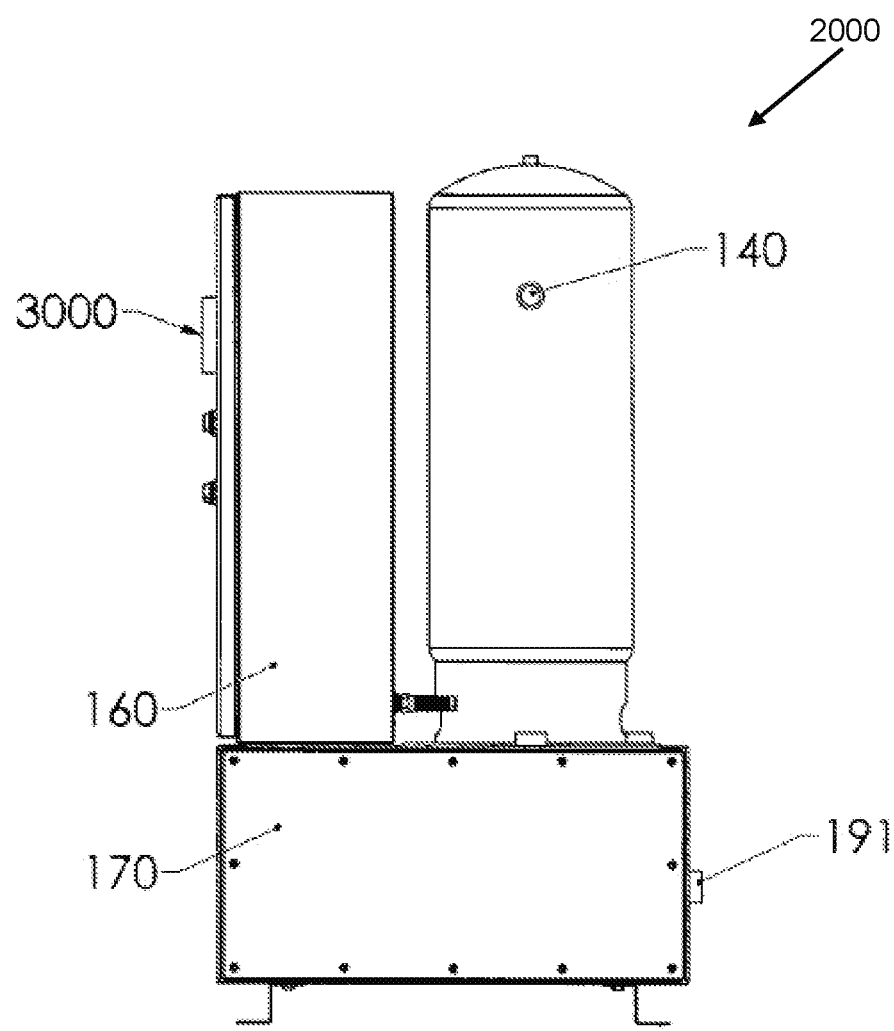
FIGS. 2B-2C are cross-sectional side views of the electrostatic fluid filtration system of FIG. 2A, consistent with various aspects of the present disclosure.
Figure 2C:
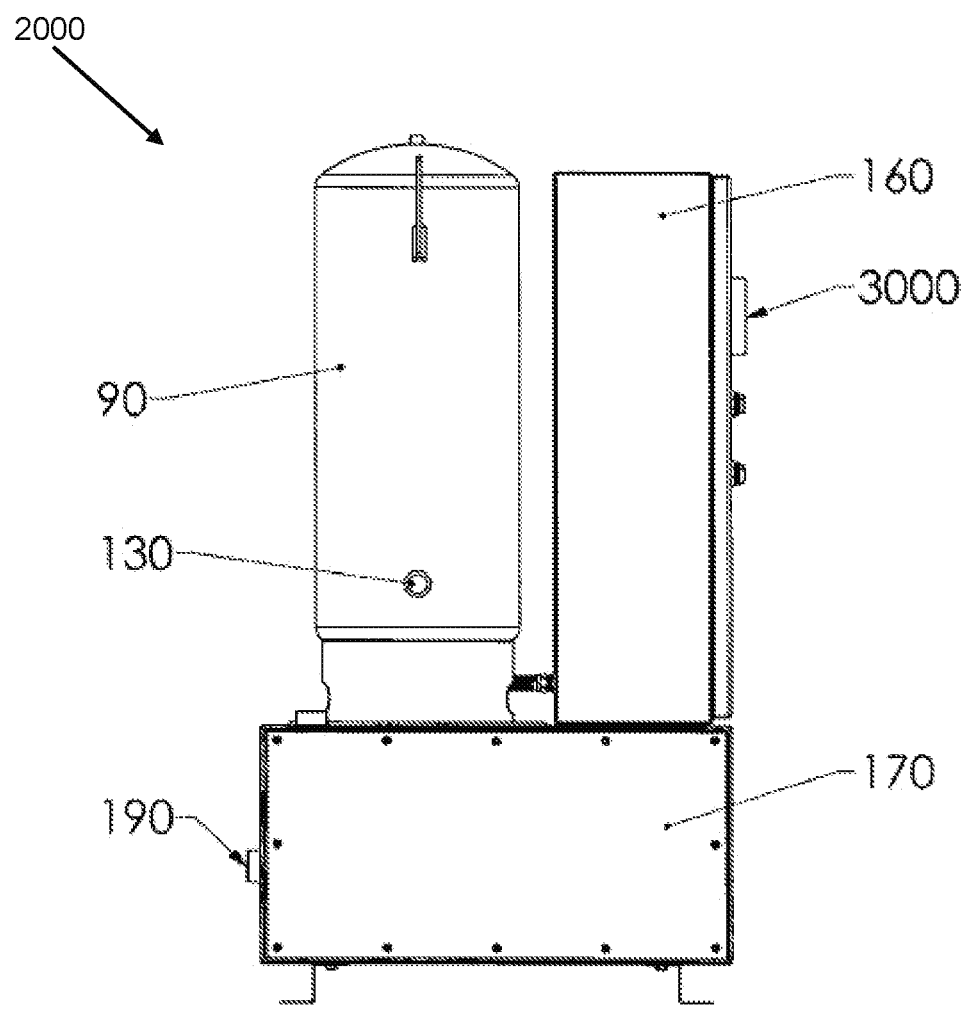

FIGS. 2B-2C are cross-sectional side view of the electrostatic fluid filtration system 2000 of FIG. 2A, consistent with various aspects of the present disclosure. An insulated high voltage module 10 coupled to bottom filter plate 20 provides a negative electrical connection to a high voltage power supply. A negative electrode 30 is interconnected to the alternating negative electrodes 30 via filter negative insulated pole connectors 100 and finally connected to top ground plate 60 and the conductive filter housing 90. Positive electrodes 40 are interconnected to one another via insulated pole connectors 101. Insulated filter support rods 120 hold the electrostatic filter cartridge 1000 rigidly together. The top ground plate 60 and a top filter plate 50 are coupled to one another with an offset. The grounding of both the top ground plate 60 and the conductive filter housing 90 prevent electrical discharge outside of the electrostatic fluid filtration system 2000.

In operation, a target fluid enters the conductive filter housing 90 at fluid inlet 130. The fluid gradually fills (at low pressure) the conductive filter housing 90 until it exits the housing via the fluid outlet 140. The target fluid flows both radially and axially throughout the conductive filter housing 90 traversing through the filter media and between the alternating positive and negative electrodes, 40 and 30. Once the conductive filter housing 90 has been pressurized by fluid, a high voltage power supply is energized and transmits power to the negative electrodes creating electrostatic fields between the positive and negative electrodes. The electrostatic fluid filtration system 2000 removes electrically conductive contamination from the fluid at the molecular level by inducing a force that separates the contamination from the fluid, which is then bonded to the positive and negative electrodes, 40 and 30. In addition, some nonconductive contaminants may be captured in the filter media between each pair of electrodes. In many embodiments, the electrostatic fluid filtration system 2000 is monitored by controller circuitry. Relevant system data may be uploaded via wired/wireless communication to remote storage and/or controller circuitry 3000.

High voltage electricity is applied to the electrostatic fluid filtration system 2000 via the insulated high voltage module 10. Filter media may be mounted to the insulated high voltage module item 10 via a twist lock connection for a negative electrical connection. The remainder of the electrostatic filter cartridge 1000 is grounded to the conductive filter housing 90 via top ground plate 60 completing the electrical circuit.

The close fitting tolerance of the positive electrode 40 to the conductive filter housing 90 forces the target fluid to flow inwards to the center of the filter assembly and then outwards to the conductive filter housing wall. The top filter plate 50 and the bottom filter plate 20 hold the filter ends rigidly together utilizing the filter support rods 120. The filter negative pole 100 is used to connect the negative electrodes to each other. The filter positive poles 101 are used to connect the positive electrodes to each other and are insulated so as not to short out to the negative electrodes. The filter media can be composed of various materials both conventional and non, these are also connected to the ground plate 60 to complete the circuit. The thickness of the filter media 70 is set to specific distance for optimized electrostatic field.

During cleaning, the electrostatic fluid filtration system 2000 may be monitored by controller circuitry 3000, which controls the pump for the fluid through the filtration system and the characteristics of the electrostatic field created between the electrodes. In various embodiments, the controller circuitry 3000 may also monitor pressure/vacuum of the system, water content of the target fluid, detect leaks, particle count (contamination), filter life, power supply output voltage and current, target fluid temperature, and fluid flow rate through the system. As discussed in more detail above, such sensory data may be utilized by the controller circuitry 3000 to display run characteristics of the system locally as well as remote in some applications, filter efficacy, and the contaminant removal rate.

FIG. 3A is a side view of an insulated high voltage module 10, consistent with various aspects of the present disclosure. The insulated high voltage module 10 including a twist lock connection 150 for easy coupling to the remainder of the electrostatic filter cartridge 1000.

FIG. 3B is a cross-sectional side view of the insulated high voltage module 10 of FIG. 3A, consistent with various aspects of the present disclosure. To operate the electrostatic field between the electrodes in the system, a high voltage power line enters through opening 300, extends through passage 250, which includes a gasket 260 that prevents the escape of fluid within the system through opening 300. The high voltage power line then extends through opening 300 and is electrically coupled to the negative electrodes within the system.

Figure 4:
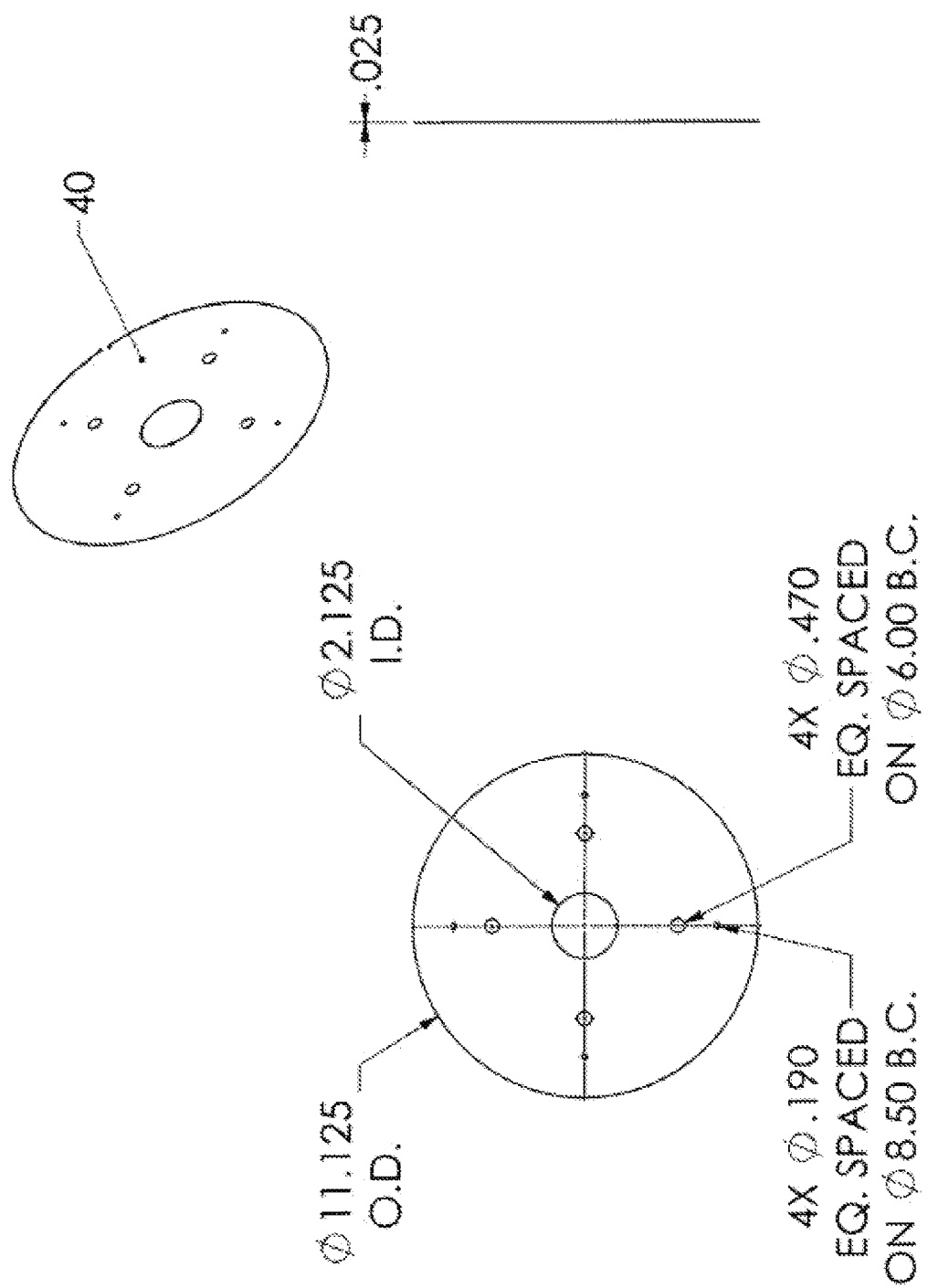
FIG. 4 is a top view of a positive electrode of an electrostatic cartridge apparatus, consistent with various aspects of the present disclosure.
Figure 5:
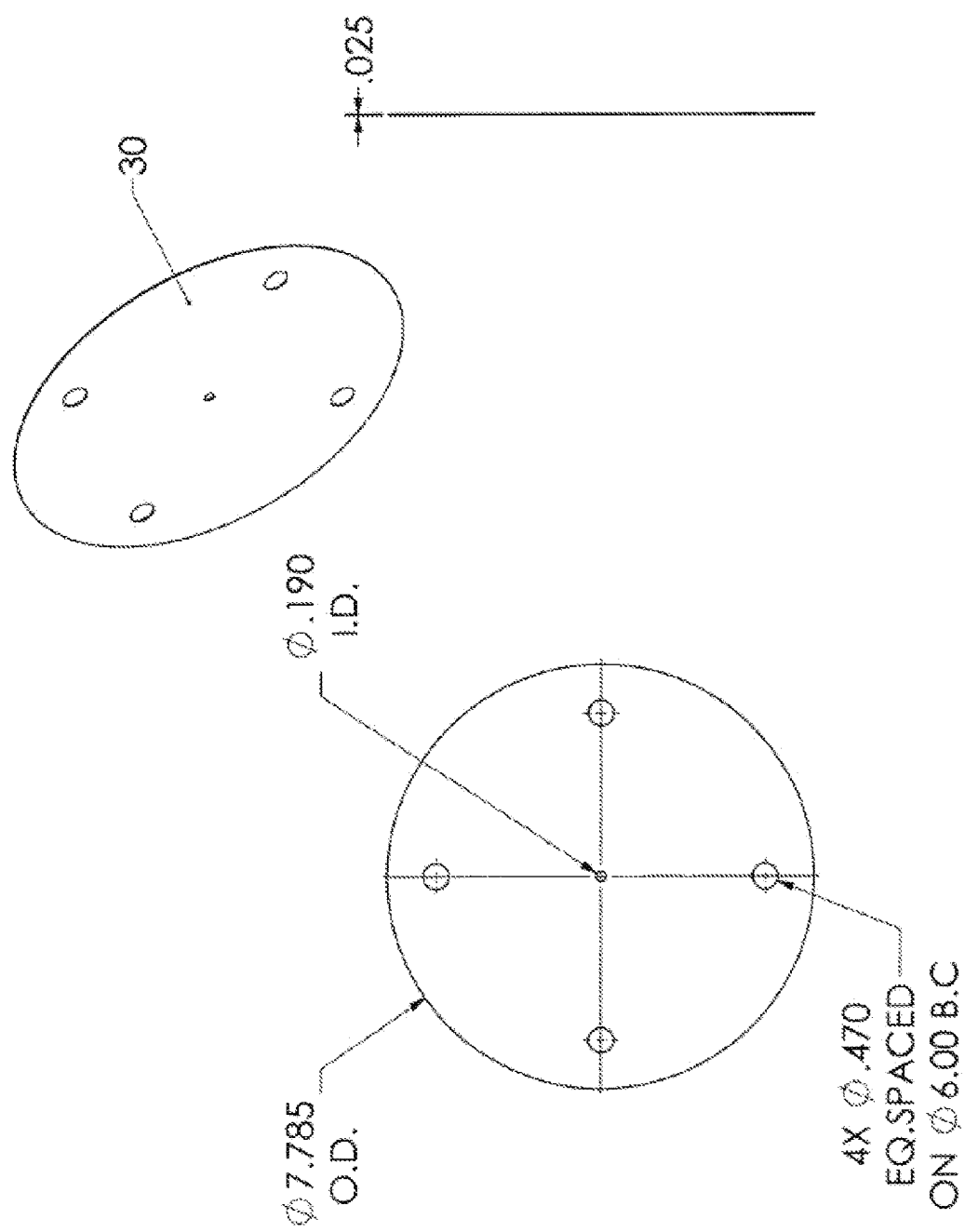
FIG. 5 is a top view of a negative electrode of an electrostatic cartridge apparatus, consistent with various aspects of the present disclosure.

FIG. 4 is a top view of a positive electrode 40 of an electrostatic filter cartridge, consistent with various aspects of the present disclosure. FIG. 5 is a top view of a negative electrode 30 of an electrostatic filter cartridge apparatus, consistent with various aspects of the present disclosure. To increase the electrostatic field between the negative and positive electrodes in an electrostatic filtration system, the electrode plates kept at a specific and consistent spacing. This greatly increasing the efficiency of the removal of fluid contaminants, especially sub-micron, insoluble, contaminants.

Figure 6:
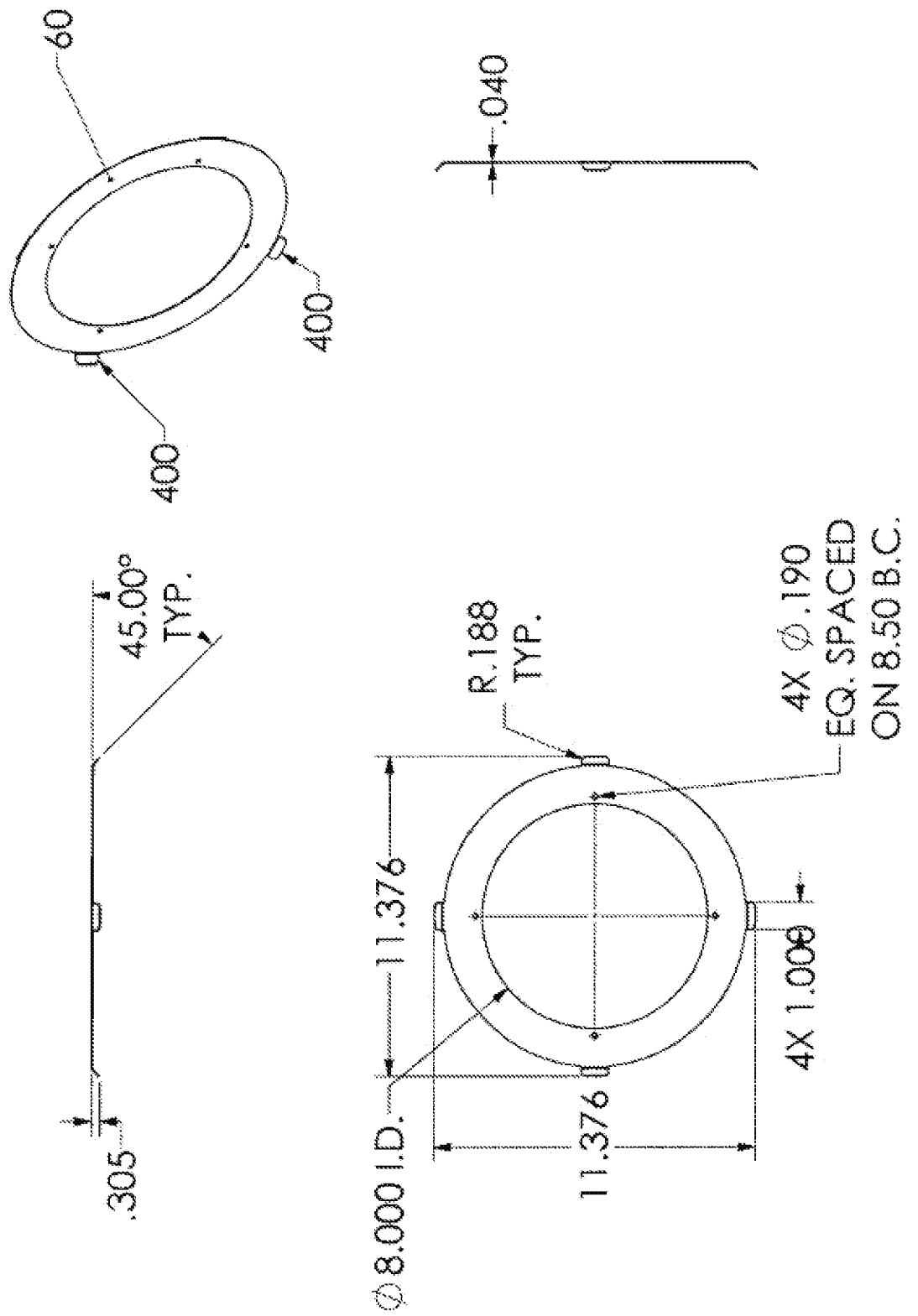
FIG. 6 is a top view of a top ground electrode of an electrostatic cartridge apparatus, consistent with various aspects of the present disclosure.

FIG. 6 is a top view of a top ground plate 60 of an electrostatic cartridge apparatus, consistent with various aspects of the present disclosure. When installed within a conductive filter housing, tabs 400 positively positions the filter cartridge assembly within the conductive filter housing, while electrically coupling the top ground plate 60 to the conductive filter housing via the tabs 400. These positive connection provide for greater power efficiency of the electrostatic filtration system.

Figure 7:
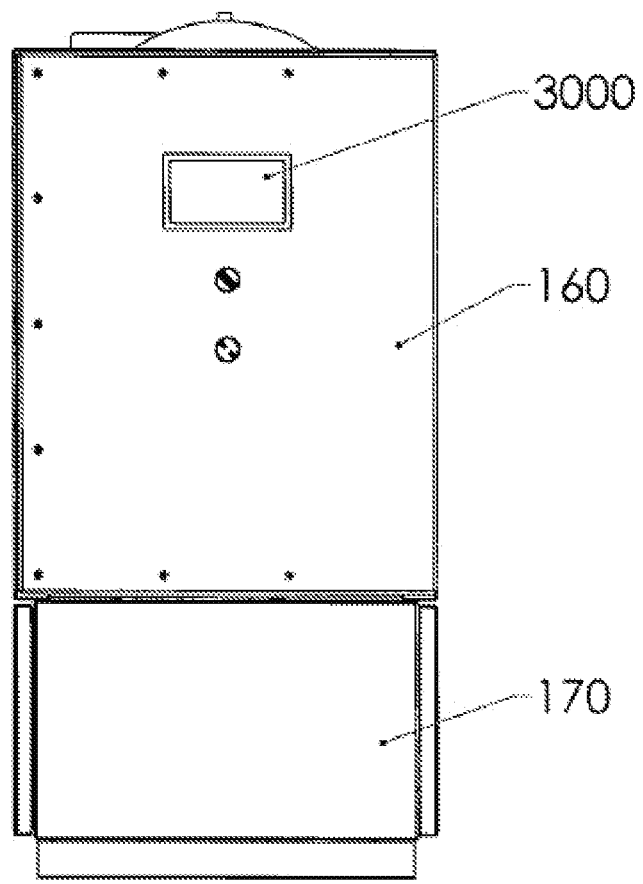
FIG. 7 is a front view of an electrostatic liquid filtration system, consistent with various aspects of the present disclosure.
Figure 8:
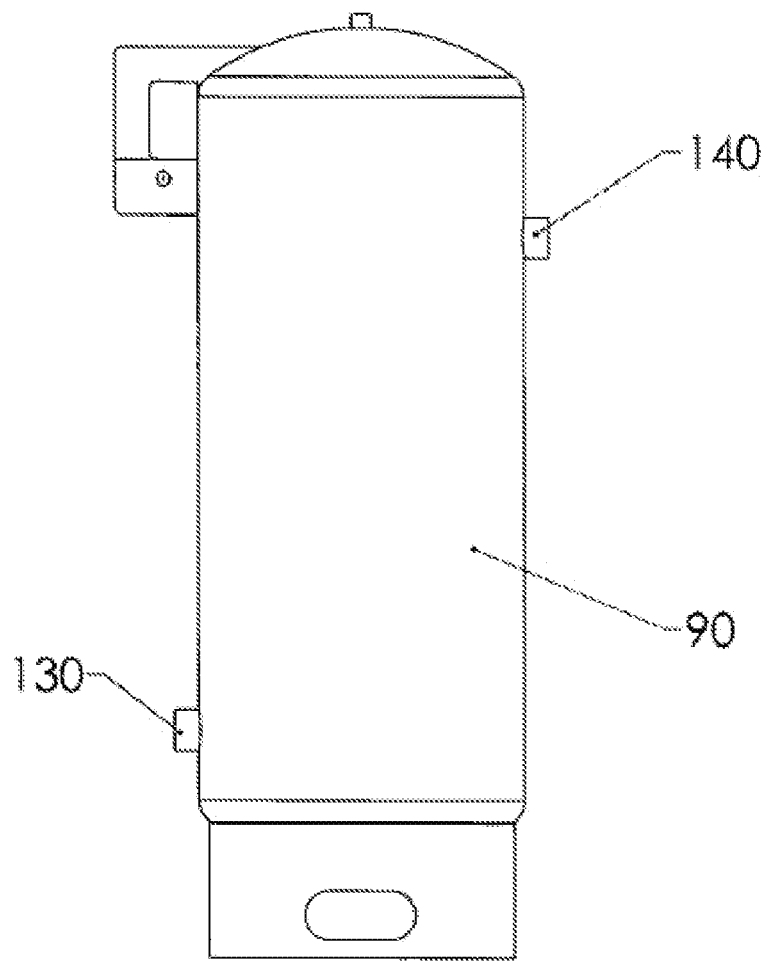
FIG. 8 is an Electrostatic Filtration Tank, consistent with various aspects of the present disclosure.
Figure 9:
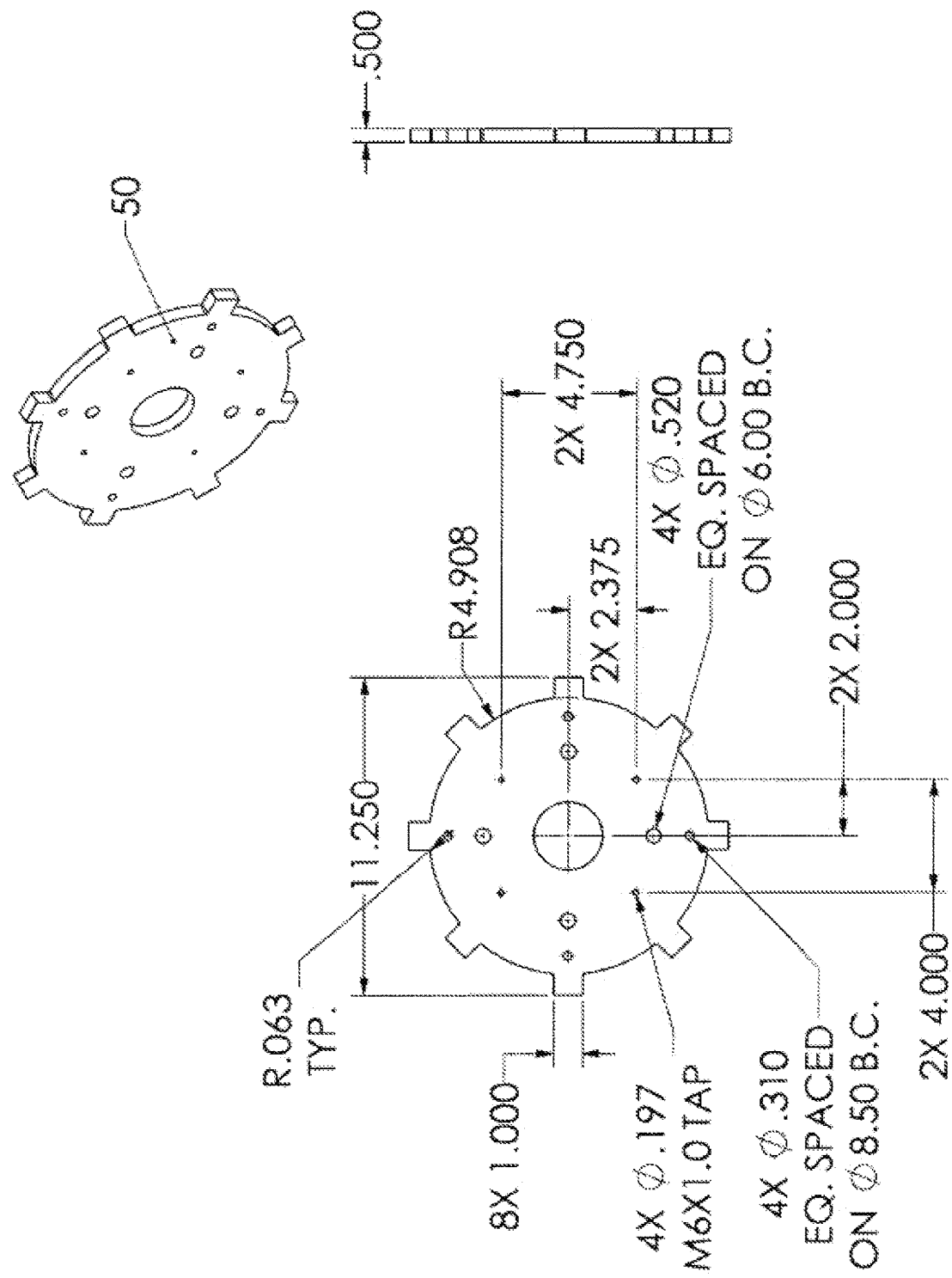
FIG. 9 is a Filter Cartridge Top CPVC Plate, consistent with various aspects of the present disclosure.
Figure 10:
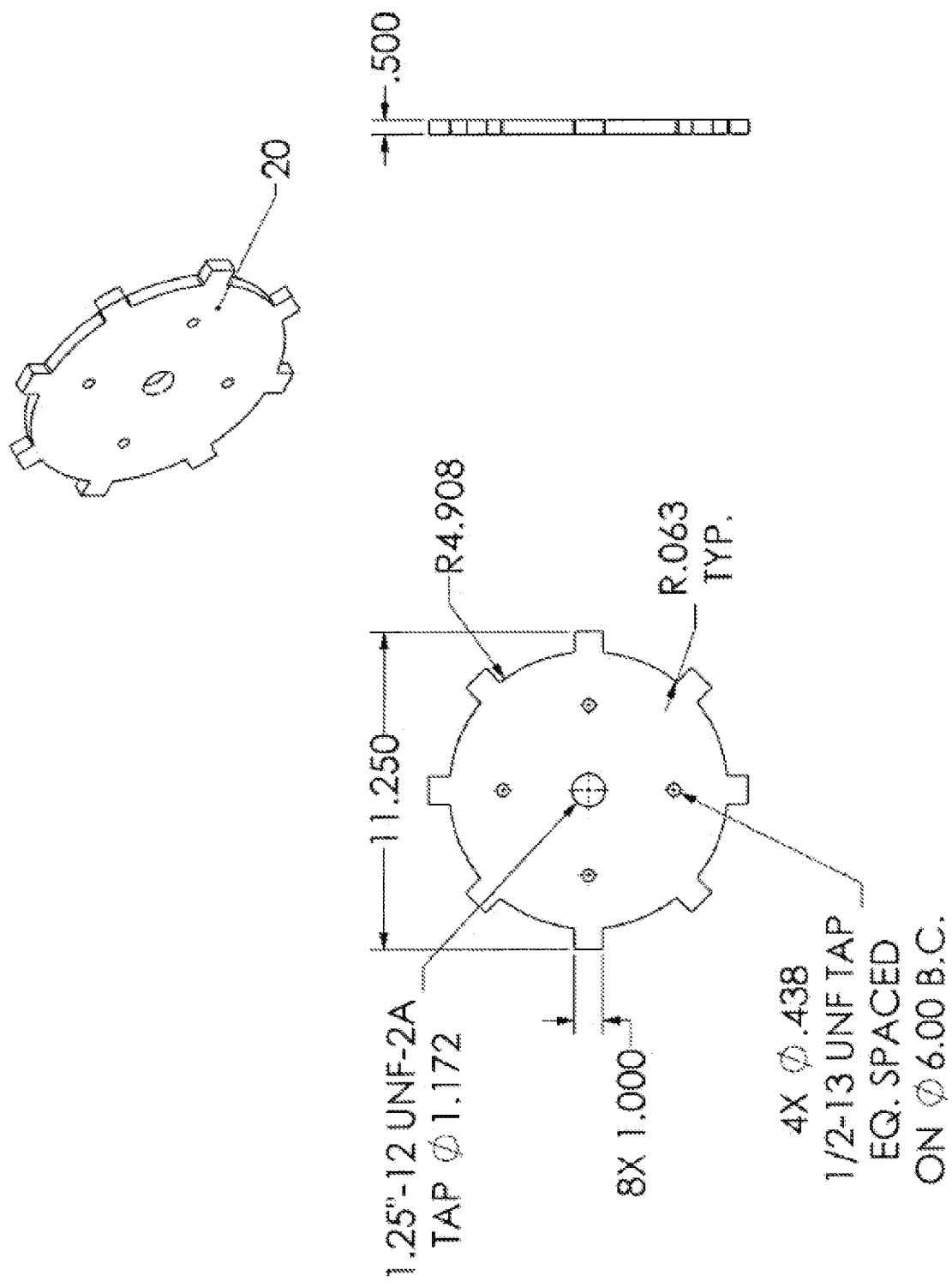
FIG. 10 is a Filter Cartridge Bottom CPVC Plate, consistent with various aspects of the present disclosure.
Figure 11:
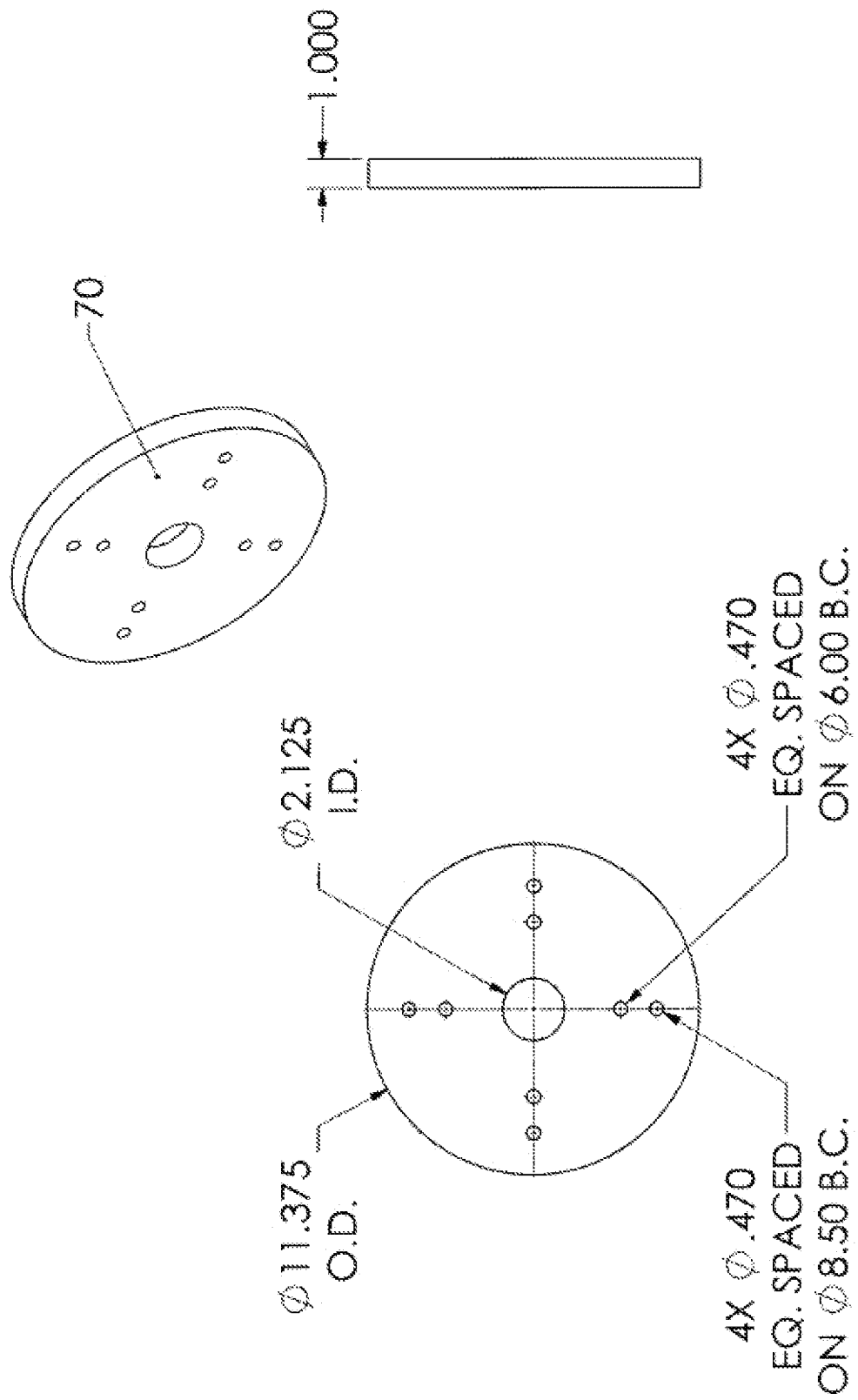
FIG. 11 is a Filter Cartridge Filtration Media, consistent with various aspects of the present disclosure.

FIG. 7 is a front view of an electrostatic fluid filtration system 2000, consistent with various aspects of the present disclosure. A housing 160 contains the entirety of the liquid filtration system including: controller circuitry 3000, particle counter display, conductive filter housing 90, hydraulic pump cabinet 170. A fluid inlet 190 and fluid outlet 191 are located at the rear of the housing 160. During operation an operator may check the status of the electrostatic fluid filtration system 2000 via the controller circuitry 3000 and/or particle counter display.

Figure 12:
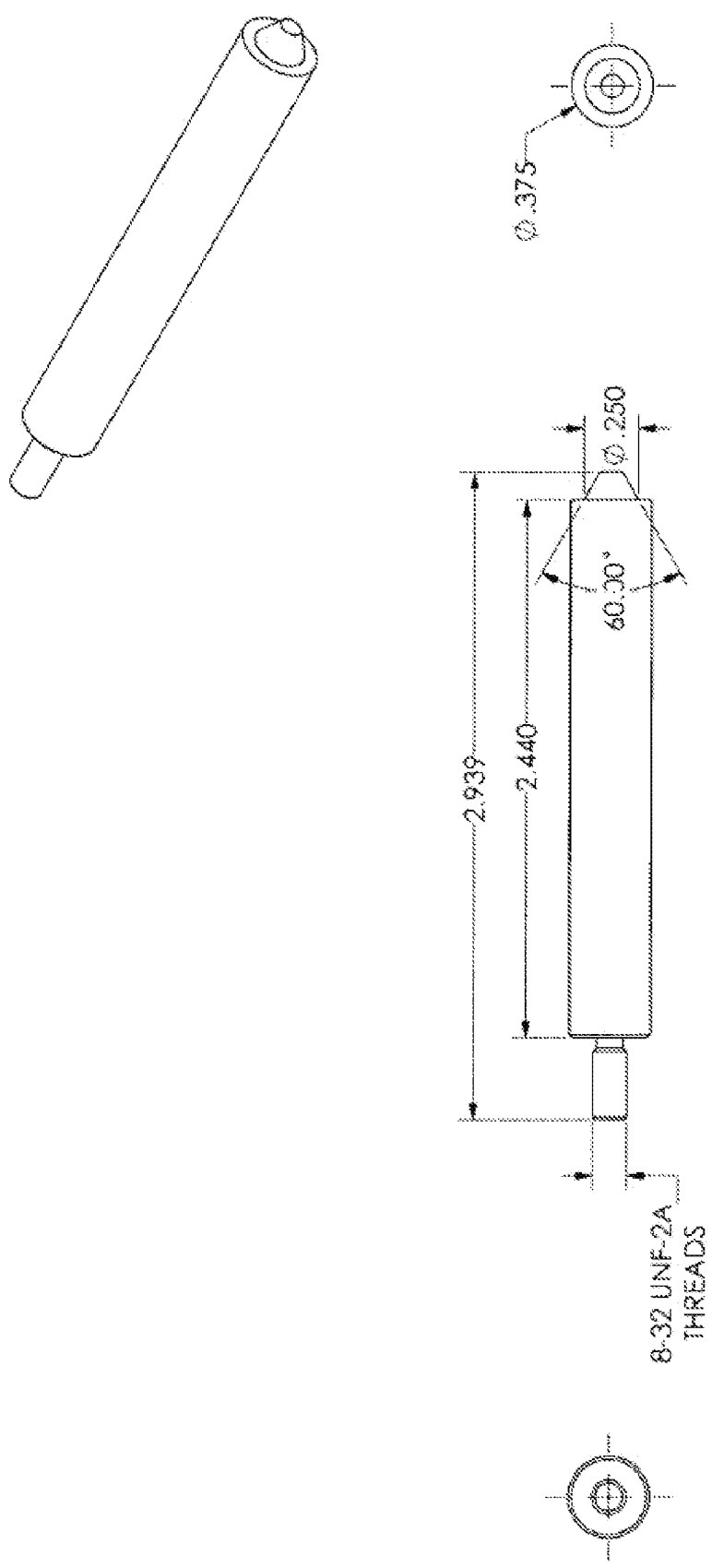
FIG. 12 shows the high voltage feed standoff, consistent with various aspects of the present disclosure.

FIG. 12 shows the high voltage feed standoff that is connected to the negative electrodes and offsets at the bottom of the electrostatic filter cartridge, consistent with various aspects of the present disclosure. This piece provides a solid mechanical connection to the negative high voltage power source via FIGS. 13A-13B.

Figure 13A:
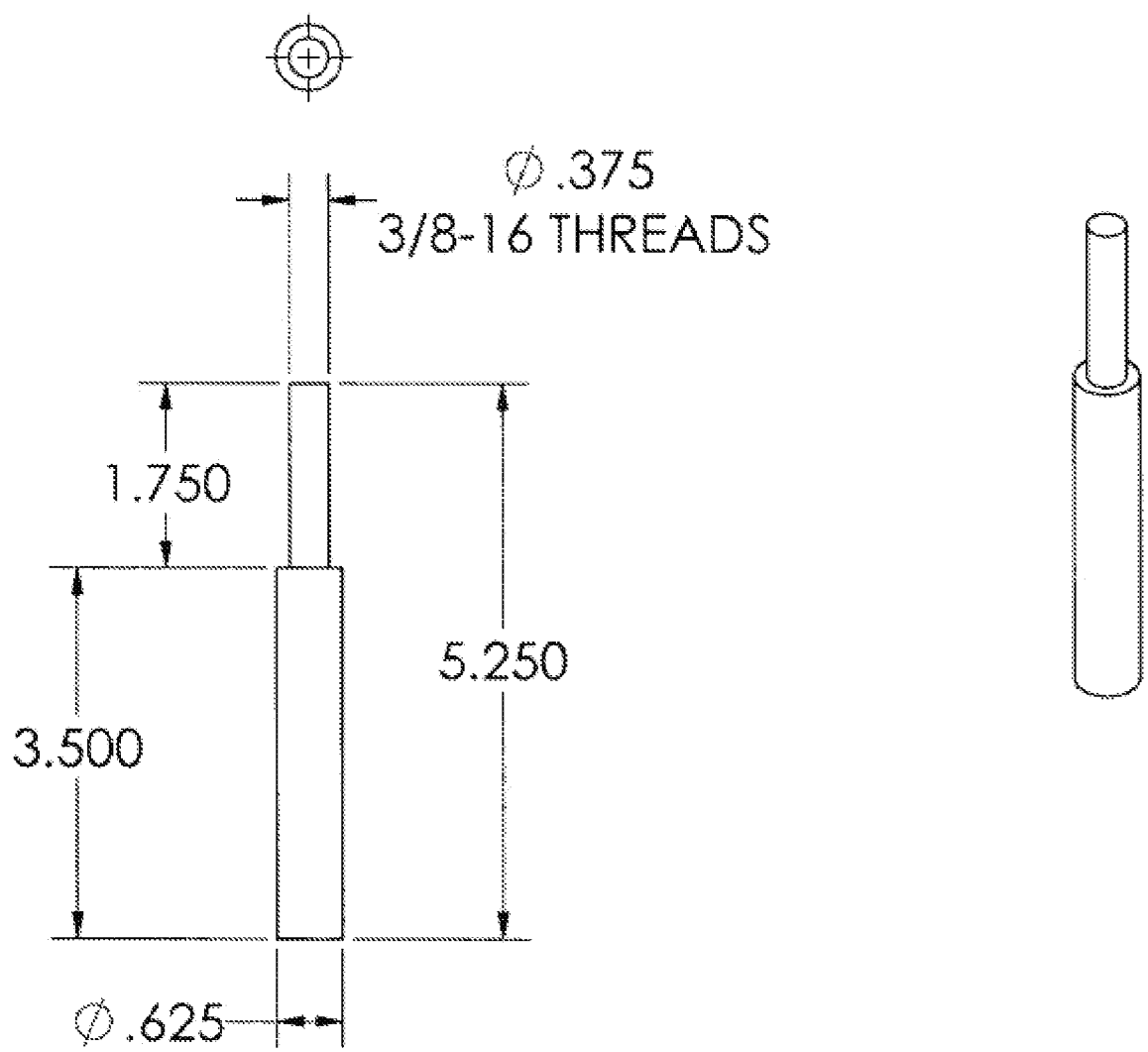
FIGS. 13A-13B show the high voltage feed tube pin, consistent with various aspects of the present disclosure.
Figure 13B:
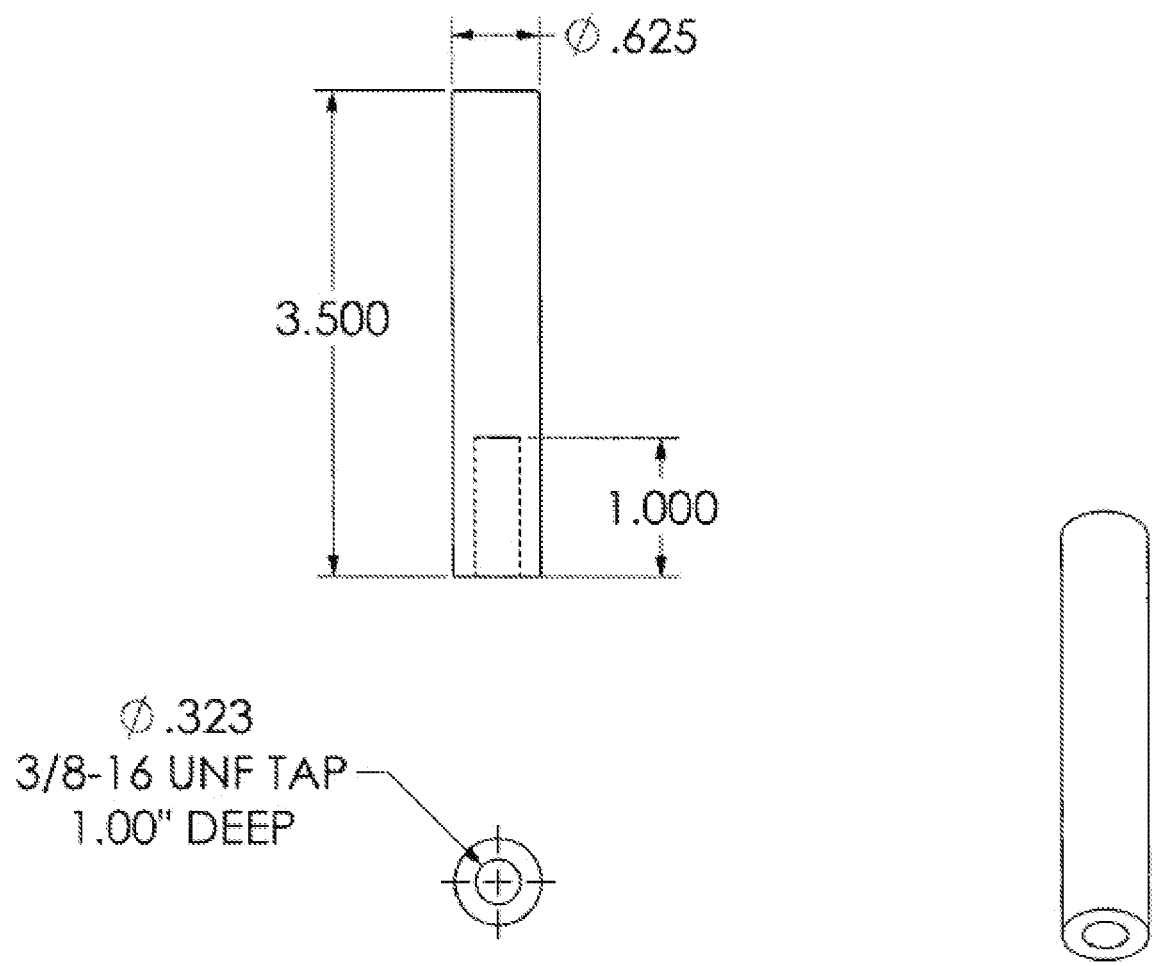
Figure 14:
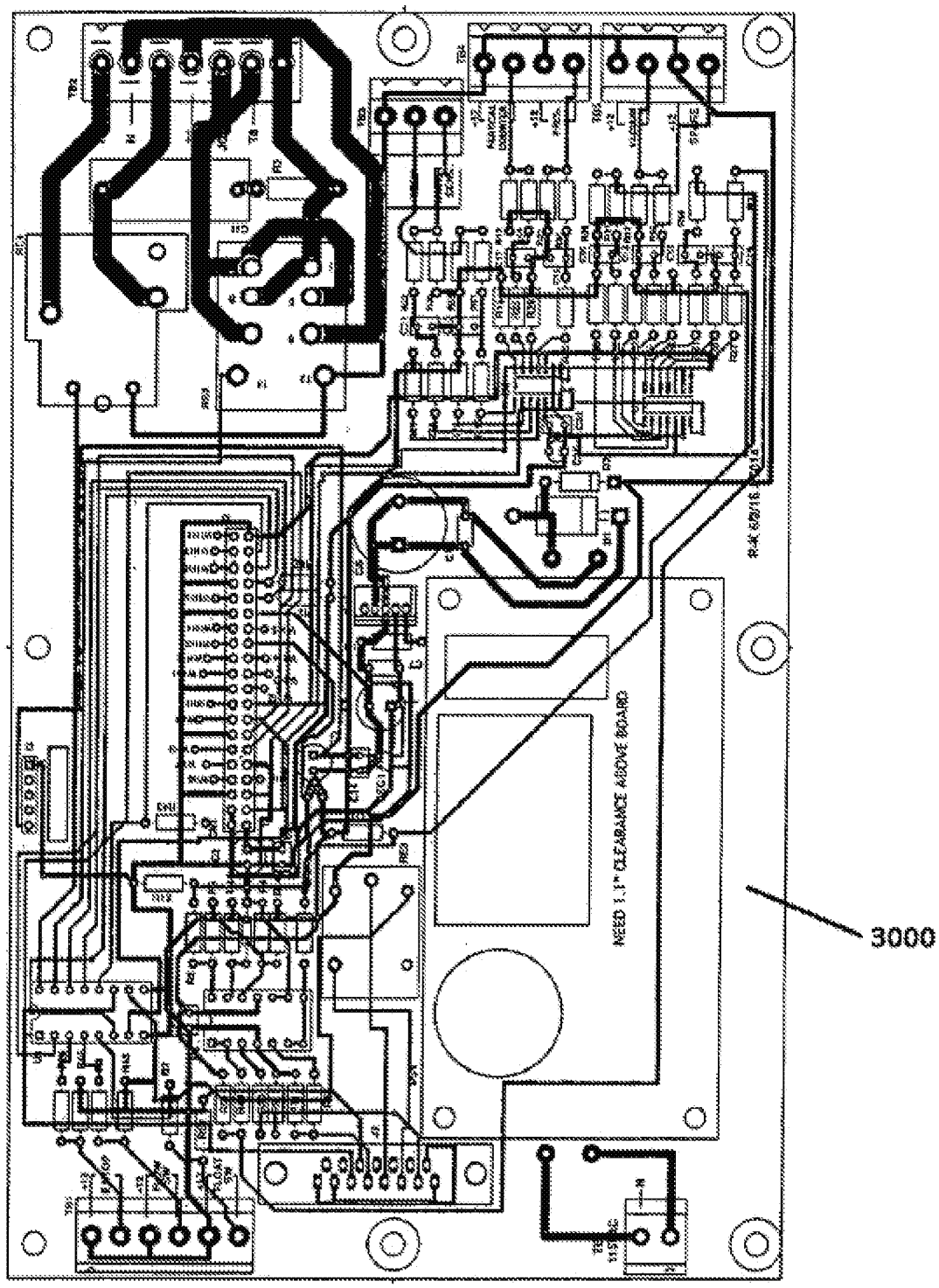
FIG. 14 is a Negative Electrostatic Filtration Apparatus Controller Circuitry, consistent with various aspects of the present disclosure.

FIGS. 13A-13B show the high voltage feed tube pin, consistent with various aspects of the present disclosure. This is a two-piece assembly, which includes a multi-purpose o-ring. The high voltage feed tube pin connects the negative electrodes 30 via the filter negative insulated pole connectors 100, to the negative high voltage power supply in the housing 160.

Based upon the above discussion and illustrations, those skilled in the art will readily recognize that various modifications and changes may be made to the various embodiments without strictly following the exemplary embodiments and applications illustrated and described herein. For example, though the above discussion has been primarily directed to applications related to contaminant filtration from fluids such as those used in hydraulic and lubrication systems, it should be readily apparent to one of skill in the art that such fluid filtration systems as disclosed herein are readily applicable to applications including lubricants used in power plants, marine vessels, cooling systems, data centers, carbon black, agricultural equipment, and manufacturing, including steel and primary metal manufacturing, water and wastewater treatment, injection molding, and chemical production. Such filtration may also be utilized in industries including construction, food and beverage, lumber and wood production, mining and quarry, oilfields, petrochemical, and military applications. Such modifications and applications do not depart from the true spirit and scope of various aspects of the disclosure, including aspects set forth in the claims.

What is claimed is:
1. An apparatus comprising:
a control panel;
an electrical cabinet;
a hydraulics cabinet;
a conductive housing;
a plurality of filter media (scalable in quantity);
a plurality of positive electrodes (scalable in quantity);
a plurality of negative electrodes (scalable in quantity);
wherein the plurality of positive and negative electrodes are alternately disposed within the conductive housing, each alternately disposed pair of positive and negative electrodes is separated by filter media and is configured to form an electrostatic field between the positive and negative electrodes in response to t negative electrodes receiving a negative voltage, the electrostatic field acts on contaminants within a dielectric fluid flowing between the positive and negative electrodes to filter the contaminants from the dielectric fluid;
wherein the filter media is configured to remove additional contaminants from the dielectric fluid;

a DC power supply electrically coupled to the negative electrodes, and configured to provide the negative voltage to the negative electrodes;

the conductive housing and the positive electrodes are electrically coupled to one another, and are configured and arranged to form an electrical ground.

2. The apparatus of claim 1, wherein the plurality of positive and negative electrodes are flat and maintain a specified spacing as to result the strongest and most consistent electrostatic field (spacing subject to scale).

3. The apparatus of claim 1, wherein the plurality of positive and negative electrodes and the conductive housing are configured and arranged to direct the flow of the dielectric fluid within the conductive housing axially in response to a first electrostatic field between a first set of positive and negative electrodes with the electrical charge, and to direct the flow of the dielectric fluid to flow radially outward towards an outer wall of the conductive housing in response to a second electrostatic field between the next pair of positive and negative electrodes with the second electrostatic field separate from the first electrostatic field.

4. The apparatus of claim 1, wherein each of the plurality of positive electrodes has a circumference greater than a circumference of each of the plurality of negative electrodes.

5. The apparatus of claim 4, wherein each of the plurality of positive electrodes are electrically and mechanically coupled to one another and the conductive housing thus creating the electrical ground.

6. The apparatus of claim 1, wherein each of the plurality of negative electrodes are electrically and mechanically coupled to one another by conductive off-sets, and each of the plurality of positive electrodes are electrically and mechanically coupled to one another by conductive off-sets.

7. The apparatus of claim 1, wherein the conductive housing further comprises a fluid inlet positioned at a distal (lower) end of the conductive housing configured and arranged to receive a flow of contaminated dielectric fluid into the conductive housing, and a fluid outlet positioned at a proximal (upper) end of the conductive housing configured and arranged to output a flow of processed dielectric fluid from the conductive housing.

8. The apparatus of claim 1, wherein the conductive housing is cylindrical.

9. A system for removing insoluble contaminants from a dielectric fluid comprising:

an electrostatic fluid filtration apparatus comprising:
a control panel;
an electrical cabinet;
a hydraulics cabinet;
a conductive housing;
a plurality of filter media (scalable in quantity);
a plurality of positive electrodes (scalable in quantity);
a plurality of negative electrodes (scalable in quantity);

wherein the plurality of alternately disposed positive and negative electrodes within the conductive housing, each alternately disposed pair of positive and negative electrodes are configured to form an electrostatic field between each of the positive and negative electrodes in response to the negative electrodes receiving a negative voltage;

wherein the electrostatic field acts on contaminants within a dielectric fluid flowing between the positive and negative electrodes to filter the contaminants from the fluid;

wherein the conductive housing and the positive electrodes are electrically coupled to one another, are configured to form an electrical ground;

wherein filter media extends between each of the positive and negative electrodes within the conductive housing; the filter media configured to remove additional contaminants from the dielectric fluid; and wherein the plurality of positive and negative electrodes and the conductive housing are configured and arranged to direct the flow of fluid within the conductive housing axially in response to a first electrostatic field between a first set positive and negative electrodes with the electrical charge, and to direct the flow radially outward towards the outer wall of the conductive housing in response to a second electrostatic field between the next pair of positive and negative electrodes with the electrostatic field separate from the first electrostatic field;

a 15 k volt DC power supply electrically coupled to the plurality negative electrodes, and configured and arranged to produce a series of alternating electrostatic fields between each pair of electrode plates (scalable);

a fluid flow pump coupled to an inlet of the conductive housing and configured and arranged to direct dielectric fluid to flow into the electrostatic fluid filtration device;

a contaminant sensor coupled to an inlet and/or outlet of the conductive housing and configured and arranged to detect a contaminant level of the dielectric fluid flowing past the contaminant sensor; and controller circuitry and software configured to receive data from a fluid flow sensor indicative of a fluid flow rate, receive data from the contaminant sensor indicative the contaminant level, receive data from a pressure and vacuum transducers indicative of apparatus' pressure, receive data from a water sensor indicative of water level, and to receive data indicative of an output of the power supply.

10. The system of claim 9, wherein the controller circuitry and software can include communication circuitry configured and arranged to transmit data received by the controller circuitry and software to remote source.

11. The system of claim 9, wherein the controller circuitry and software is further configured and arranged to display and analyze the fluid flow rate of the fluid flow sensor, the data from the contamination sensor, output of the power supply, data from the water sensor, and data from the pressure and vacuum transducers to report the filter life.

12. The system of claim 9, wherein the water sensor is coupled to an inlet of the electrostatic fluid filtration device and is configured to transmit data to the controller circuitry and software indicative of the existence of water within the dielectric fluid entering the electrostatic fluid filtration apparatus, and the controller circuitry and software are further configured to shut down the fluid flow pump and output of the power supply, in response to receiving data from the water sensor indicative of the existence of water within the fluid flow.

13. The system of claim 9, wherein the controller circuitry and software is configured to display and analyze the data indicative of the fluid flow rate received from the fluid flow sensor, the data from the contamination sensor, output of the power supply, data from the water sensor, and data from the pressure and vacuum transducers, and characterize the degradation of the fluid filter within the electrostatic fluid filtration apparatus.

14. The system of claim 13, wherein the controller circuitry and software if further configured to indicate to an operator that a filter change is necessary once the degradation of the filter exceeds a threshold level.

15. The system of claim 9, wherein the electrostatic fluid filtration device is further configured to decrease the amount of varnish within the machine surfaces in contact with the fluid by reducing the contaminant level within the fluid below a contaminant saturation level.

16. The system of claim 9, further comprising a reservoir configured to hold the fluid, wherein the reservoir is coupled to an inlet and outlet of the electrostatic fluid filtration apparatus in a kidney loop or in-line configuration.

\* \* \* \* \*